United States Patent
Kulach et al.

(10) Patent No.: US 10,401,243 B2
(45) Date of Patent: Sep. 3, 2019

(54) SKI POWER MEASUREMENT SYSTEM

(71) Applicant: Garmin Switzerland GmbH, Schaffhausen (CH)

(72) Inventors: Christopher J. Kulach, Calgary (CA); Timothy Vandermeiden, Calgary (CA); Mason V. N. Hender, Calgary (CA)

(73) Assignee: Garmin Switzerland GmbH (CH)

( * ) Notice: Subject to any disclaimer, the term of this patent is extended or adjusted under 35 U.S.C. 154(b) by 444 days.

(21) Appl. No.: 15/410,673

(22) Filed: Jan. 19, 2017

(65) Prior Publication Data

US 2017/0211997 A1 Jul. 27, 2017

Related U.S. Application Data

(60) Provisional application No. 62/286,057, filed on Jan. 22, 2016, provisional application No. 62/346,650, filed on Jun. 7, 2016.

(51) Int. Cl.
| | |
|---|---|
| *G01C 21/00* | (2006.01) |
| *G01L 3/24* | (2006.01) |
| *A63C 11/22* | (2006.01) |
| *G01L 5/00* | (2006.01) |
| *A63C 5/06* | (2006.01) |

(52) U.S. Cl.
CPC .............. *G01L 3/247* (2013.01); *A63C 5/06* (2013.01); *A63C 11/224* (2013.01); *A63C 11/227* (2013.01); *A63C 11/228* (2013.01); *G01L 5/0095* (2013.01); *A63C 2203/12* (2013.01); *A63C 2203/18* (2013.01); *A63C 2203/22* (2013.01); *A63C 2203/24* (2013.01)

(58) Field of Classification Search
None
See application file for complete search history.

(56) References Cited

U.S. PATENT DOCUMENTS

2008/0046179 A1* 2/2008 Mackintosh ....... A63B 24/0021
701/468
2018/0036624 A1* 2/2018 Muuli ...................... A45B 3/00

OTHER PUBLICATIONS

M. Pohjola, 'Analysing effectiveness of force application in ski skating using force and motion capture data—A model to support cross-country skiing research and coaching', MSc. Thesis, University of Jyvaskyla, 2014.

(Continued)

*Primary Examiner* — Janet L Suglo
*Assistant Examiner* — Mark I Crohn
(74) *Attorney, Agent, or Firm* — Samuel M. Korte; Max M. Ali

(57) ABSTRACT

A system for measuring power generated by a skier is disclosed. The power generated by the skier may be calculated based upon each complete revolution of a ski pole or ski movement. To do so, the system may include various sensors that measure a force exerted on a ski pole or ski, the angle of the ski pole or ski, and the velocity of the skier at various time instants within each ski pole or ski revolution. A processing unit may calculate power generated by the skier in the skier's direction of travel using the force exerted in the skier's direction of travel during a complete revolution of ski pole (or ski) movement and the velocity of the skier.

20 Claims, 11 Drawing Sheets

(56) References Cited

OTHER PUBLICATIONS

S. Babiel, 'Feldstudie zu biomechanischen Einflussgrößen in ausgewählten Skilanglauf-Techniken', Thesis, Ruhr-University Bochum, 2002.

H.C. Holmberg, S. Lindinger, T. Stöggl, E. Eitzlmair, and E. Muller, "Biomechanical Analysis of Double Poling in Elite Cross-Country Skiers," Medicine & Science in Sports & Exercise, vol. 37, No. 5, pp. 807-818, 2005.

Printout from http://www.montana.edu/news/9158/new-equipment-in-msu-s-movement-science-human-performance-lab-helps-skiers USU News Science, Nov. 22, 2010.

Printout from http://thoraxtrainer.com/ published prior to Jan. 19, 2017.

Printout from http://www.concept2.com/skierg published prior to Jan. 19, 2017.

Printout from http://www.proskida.com/ published prior to Jan. 19, 2017.

P. Komi, "Force Measurements During Cross-Country Skiing", International Journal of Sport Bionechanics, 1987, 3, 370-381.

V. Linnamo, "Measurement Technologies in Cross Country Skiing", University of Jyvaskyla, Finland, University of Tubingen, Germany, University of Salzburg, Austria, dated prior to Jan. 19, 2017.

* cited by examiner

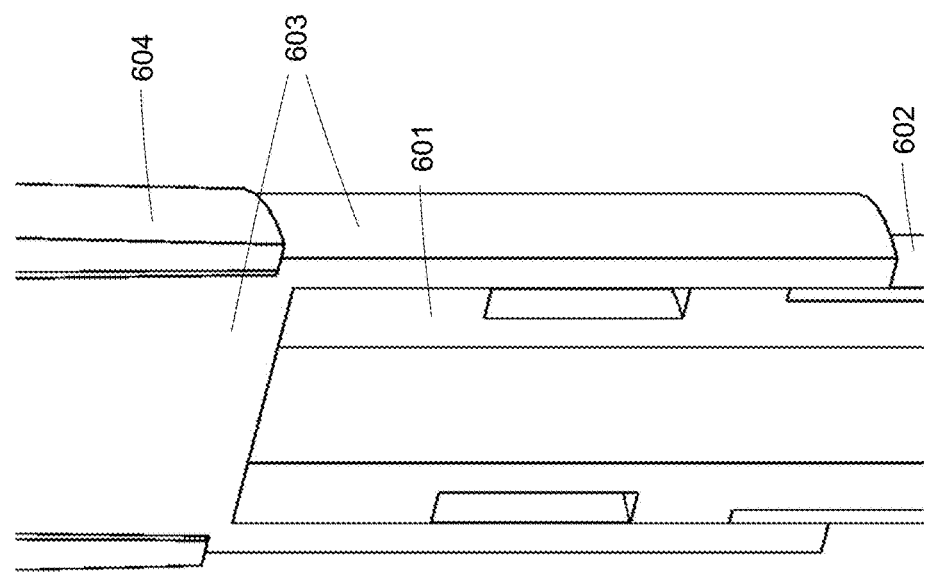

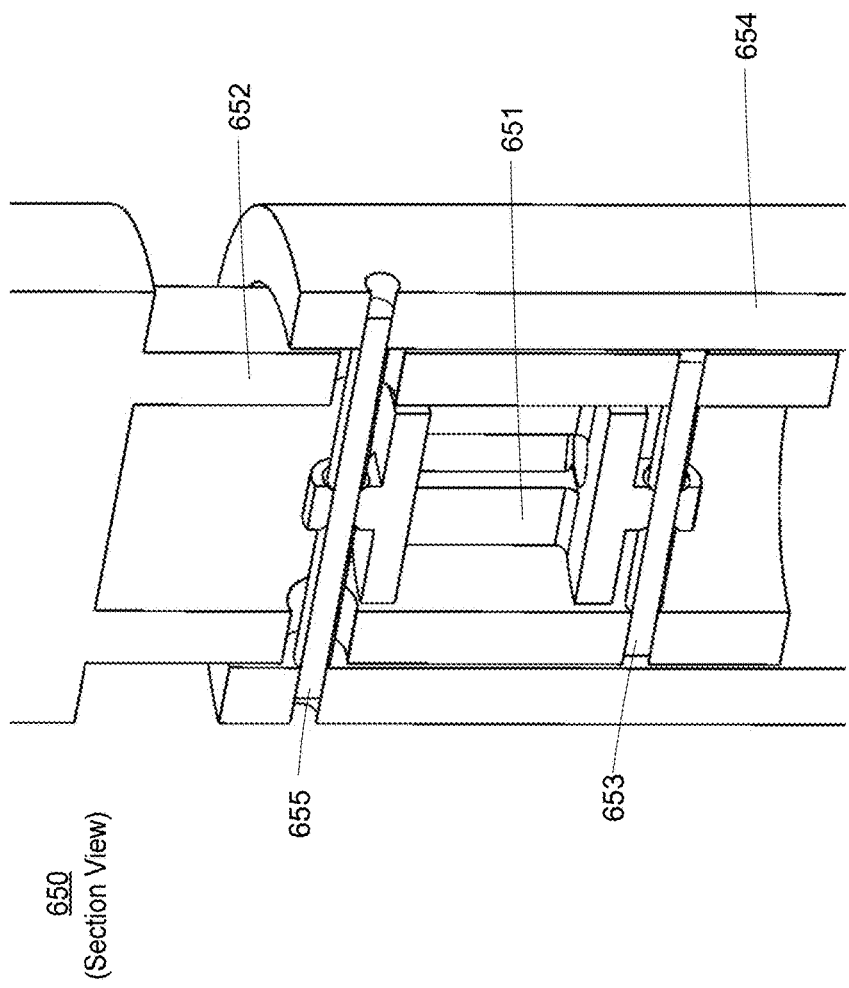

SKI POWER MEASUREMENT SYSTEM

CROSS-REFERENCE TO RELATED APPLICATIONS

The priority benefit of U.S. Provisional Patent Application No. 62/286,057, entitled "Power Measurements or Skiing," filed on Jan. 22, 2016, and U.S. Provisional Patent Application No. 62/346,650, entitled "Power Measurements or Skiing," filed on Jun. 7, 2016, are claimed and the disclosure of each of which is hereby incorporated by reference in its entirety.

TECHNICAL FIELD

The present disclosure relates generally to calculating various metrics related to skiing and, more particularly, to a system that collects sensor data while a skier is skiing to calculate and optionally display a power generated by the skier and/or other skiing metrics.

BACKGROUND

Wearable electronic devices have become increasingly advanced, and it is commonplace to use such devices when exercising to monitor certain metrics related to a particular exercise. For example, a runner may wear an electronic device that measures calories burned and the overall distance of a run. For exercises such as running and cycling, methods exist for measuring power exerted by the user during the exercise (i.e., calories burned). For example, partial power generated by a runner can be calculated by determining the energy consumed when raising the runners center of mass each step and moving forward. Therefore, the power exerted while running can be calculated as a function of vertical acceleration, and the user's mass, and each of these components of the calculation can be easily obtained with simple sensor measurements or using information provided by the user.

However, the calculation of power generated by the user is more complex for other types of activities, such as skiing. For instance, the force exerted by the skier while skiing is not the result of the skier raising his center of mass to overcome gravity, but rather in propelling or "pushing" himself forward on what is often uneven terrain. Therefore, determining power generated by a skier while skiing presents several challenges.

SUMMARY

The present disclosure is directed to system for measuring power generated by a skier and displaying this power, among other useful metrics, while the skier is skiing or after the skier has finished skiing. In an embodiment, the upper body power generated by a skier may be calculated by measuring the force exerted on the ski poles, which may be particularly useful for classic cross country skiing styles. To do so, the system may include various sensors that measure an exerted force on the ski poles, the cyclical motion of the ski pole, the speed the skier moved in the direction of travel and/or the speed of the skier between each complete revolution of ski pole movement. By correlating the timing of the ski pole movement to the force exerted through the ski pole, the angle of the ski pole may be utilized to calculate a vector component of the force exerted on or through the ski pole in the skier's direction of travel. This information may be utilized to determine the power exerted by the skier throughout each entire revolution of ski pole movement. The power exerted over several complete ski pole revolutions may also be aggregated to determine an average power exerted by the skier.

In other embodiments, sensors may be additionally or alternatively implemented in various portions of the skis, bindings or ski boots to measure the lower body power generated by the skier. Furthermore, the skier may wear additional sensors on other parts of her body such as the chest or legs to provide sensor measurements indicative of the appropriate dynamics associated with those portions of the skier's body. For both upper and lower body power measurements, the embodiments include calculating and/or displaying other types of metrics in addition to the power generated by the skier to allow the skier to view these metrics while skiing or after skiing. The skier may use these metrics to analyze and improve her form during current and subsequent skiing sessions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIG. 6A is a graphical representation illustrating one possible load sensor and adjacent pole components, according to an embodiment.

FIG. 6B is a graphical representation illustrating another possible load sensor and adjacent components, according to an embodiment.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

The details regarding the angular relationship of the ski poles and the mathematics used to calculate the power generated by the skier are provided in the provisional applications referenced above. However, for the sake of clarity, this information is also presented in this disclosure with reference to FIGS. 1A-1B. Although the explanation of the mathematics and calculations are provided herein with respect to the calculation of upper body power, the calculation of lower body power utilizes similar mathematical concepts.

The techniques described with reference to FIGS. 1A-1B and elsewhere herein are performed with reference to various two-dimensional frames of reference. These 2D frames of reference as defined as follows:

World frame: Described with reference to the horizontal and vertical components based on flat ground, which is always aligned with gravity. The world frame is denoted by the vertical axis 101.1 and the horizontal axis 101.2.

Skier frame: Described with reference to the velocity of the skier's center of mass. The skier frame is denoted with the subscript S. On flat ground, this frame is parallel to the world frame, but the skier frame rotates on a hill to match the pitch of the hill.

Pole frame: Described with reference to the orientation of the ski pole. The ski pole axial force, $F_{pole}$, is always aligned with the shaft of the pole and thus rotates with the pole frame of reference.

Figure 1A:
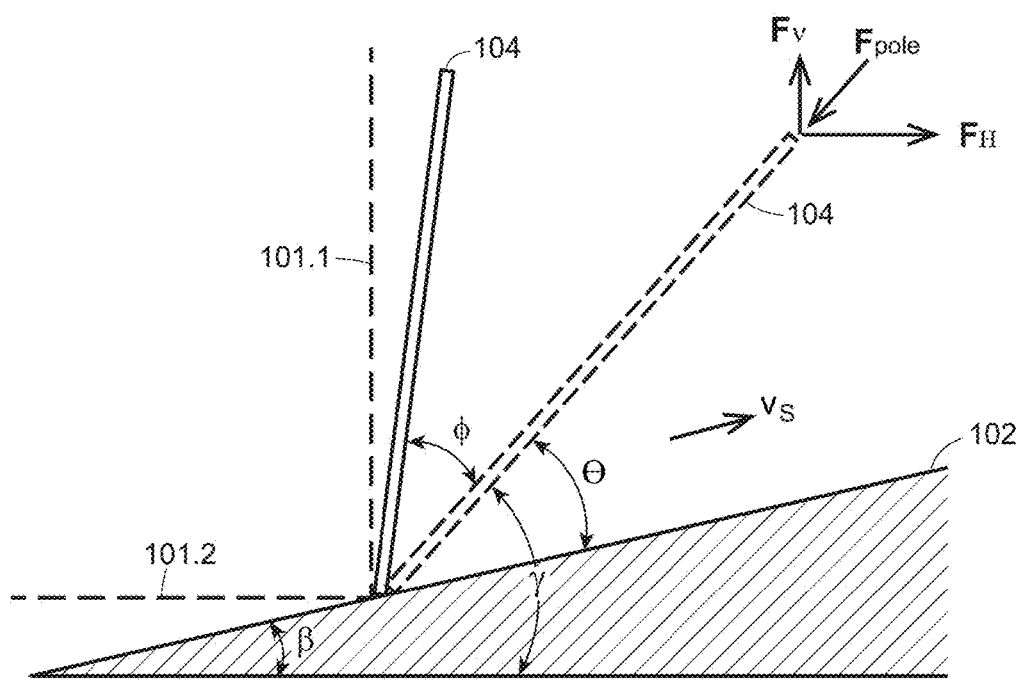
FIGS. 1A-1B are diagrams illustrating the mathematics associated with measuring and calculating components of power exerted by a skier and ski pole angle, according to embodiments.
Figure 1B:
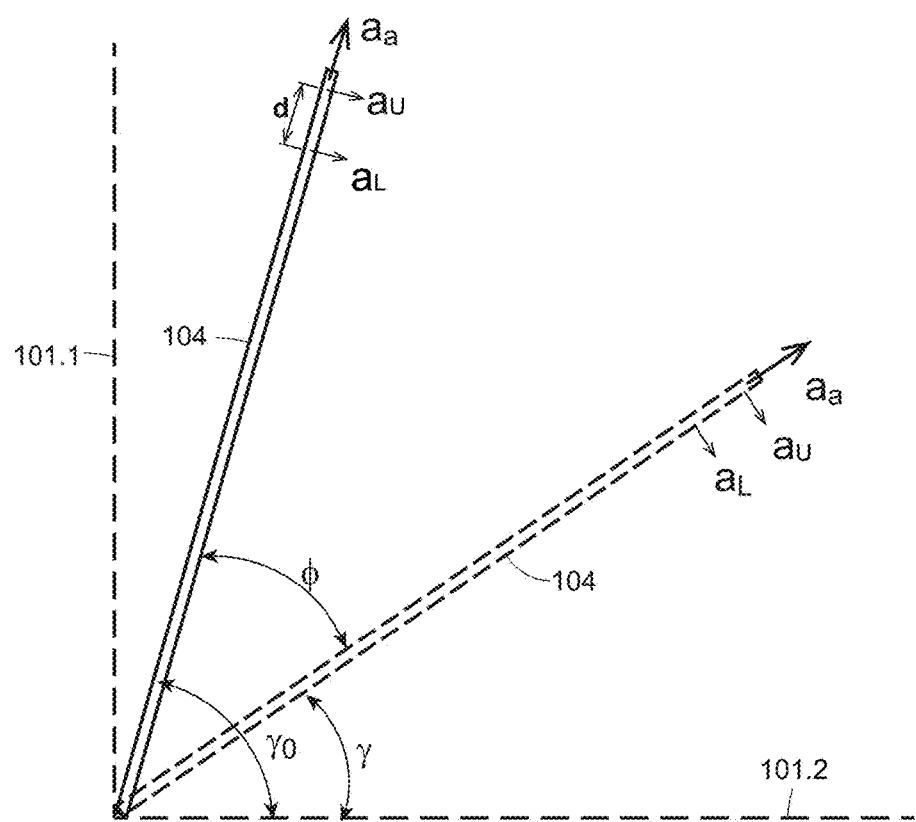

With these frames of reference in mind, the mathematics associated with FIGS. 1A-1B is now introduced. As shown in FIG. 1A, a terrain 102 (e.g., ski slope, ski trail, etc.) forms an angle $\beta$ (beta) with respect to the flat ground. The ski pole 104 is shown in an initial position in solid lines and another subsequent position in dashed lines. Common forms of skiing, such as cross-country skiing, begin with a skier outstretching both arms and planting both ski poles into the ground (with the bottom of the ski poles (tips) slightly trailing the grips (or straps) of the ski poles such that the ski pole shaft is leaning forward). The skiing forms typically continue with the skier propelling or "pulling" himself forward by exerting a force on or through the planted ski poles until the skier is positioned in front of the ski pole tips that are planted in a terrain being skied. The skier's hands are commonly positioned alongside or behind the skier when the skier pulls the ski poles out of the terrain and stretches both arms out in front of the skier to plant the ski poles back into the terrain. This sequence of movements is typically used in a complete revolution of ski pole movement and repeated by the skier to move in a direction of travel on the terrain.

As the skier moves in a particular direction of travel, the ski pole 104 is placed into the terrain 102 and the skier applies the force $F_{pole}$ in an axial direction with respect to the ski pole. As shown in FIG. 1A, $F_{pole}$ has a vertical component and a horizontal component, which are aligned with the vertical world frame axis 101.1 and horizontal world frame axis 101.2, respectively.

As the skier moves forward (the ski pole 104 is still planted in the ground during a complete revolution of ski pole movement), the angle of the ski pole 104 decreases relative to the horizontal world frame axis 101.2, as indicated by the angle $\gamma$ (gamma), while the angle of the ski pole 104 also decreases relative to the skier's frame, as indicated by the angle $\theta$ (theta). In other words, the ski pole 104 (shaft) is rotating from a substantially upright position toward terrain 102 in a direction of travel. The angle $\phi$ (phi) represents the change in the angle of the ski pole 104 between two different instants of time during a complete revolution of movement of the ski pole 104. That is, as the skier moves forward in a direction of travel, the angles $\gamma$ and $\theta$ decrease, while the angle $\phi$ increases. This angular change continues to occur as the skier pulls himself forward until the skier picks up the ski pole 104 (removing the tip of the ski pole 104 from terrain 102) and re-plants it into terrain 102 in front of the skier, thus starting another poling cycle with the angles $\phi$ and $\gamma$ in their new starting positions. Therefore, a complete revolution of ski pole movement (i.e., a poling cycle) is a cycle in which the skier plants the ski pole 104 into terrain 102, moves forward on the skis by some distance on slope 102 while ski pole 104 is planted in terrain 102, picks up the ski pole 104 from terrain 102, and moves ski pole 104 in front of the skier to be re-planted into terrain 102.

The start (and end) point of the cycle for the purposes of calculating power may be the moment at which the user plants the ski pole. However, it may also be any other moment during the cycle. Pole axial force and/or acceleration signals and/or signals from other sensors may be analyzed for distinguishing features which can be used to identify moments in time which are used as start/end moments of the cycle.

To calculate the power generated by the skier in such a scenario, the general equation for one-dimensional power transfer is introduced in Eqn. 1 below:

$P(t) = F(t) \cdot v(t)$, where $F(t)$ is the applied force and $v(t)$ is the speed of a particular body (e.g., the skier) in a direction of travel.      Eqn. 1:

However, the above Eqn. 1 only applies to limited situations in which the applied force is in the same direction as the speed of the body. When at least some of the force is not applied in the same direction as the movement of the body in a direction of travel, power transfer is calculated by the more general Eqn. 2, as shown below:

$P(t) = F(t) \cdot v(t)$, where $F(t)$ is the force vector, $v(t)$ is the velocity vector, and the power is calculated as the dot product of the two vectors.      Eqn. 2:

In the case of a skier, the power through the ski pole 104, therefore, is provided by Eqn. 3 below:

$P(t)_s = F(t)_s \cdot v(t)_s = F(t)_s v(t)_s \cos \theta(t)$, where $F(t)_s$ is a reaction force vector applied by the ski pole 104 on the skier, $v(t)_s$ is the skier's velocity vector and $\theta$ is the angle between the two vectors.      Eqn. 3:

As shown in FIG. 1A, $v(t)_s$ is represented as "$V_s$" for a particular instant in time during the poling cycle.

In other words, to calculate the instantaneous power exerted by the skier at a particular instant in time, the vector component of force exerted by the skier opposite to and parallel with the direction of travel results in skier movement in the direction of travel, needs to be determined for that same instant in time. To do so, embodiments include tracking and/or calculating the force $F_{pole}$ and the angle $\theta$ (i.e., the angle of ski pole 104 with respect to terrain 102) throughout a complete revolution of ski pole movement using various sensors, which are further discussed below. For example, data may be sampled at several frames or intervals (i.e., instants in time) throughout a complete revolution of ski pole movement. Within each frame, the vector component of force exerted by the skier on or through the ski pole that is in the skier's direction of travel may be calculated. Furthermore, the distance traversed by the skier and/or the speed of the skier in the plane of terrain 102 within each frame may be determined. By correlating the timing of these measurements, the instantaneous force exerted by the skier resulting in movement in the direction of travel and the instantaneous velocity of the skier in the direction of travel may be determined for each frame within the complete revolution of ski pole movement. These instantaneous measurements may then be used to calculate the power generated by the skier over the complete revolution of ski pole movement. The mathematical details of these calculations with reference to specific types of sensors are further discussed below with reference to FIG. 1B.

In an embodiment, the, instantaneous pole angle $\gamma$ may be utilized to calculate the power generated by the skier over each frame within a complete revolution of ski pole movement. Although these calculations are performed with reference to the world frame of reference, the angle of the ski pole 104 relative to the skier's frame of reference may be obtained by identifying and subtracting out the angle $\beta$ with respect to the horizontal axis, which is further discussed below. The angle of the ski pole 104 with respect to the skier's reference may then be used to calculate the force exerted by the skier in the skier's direction of travel and the power.

In various embodiments, the angle of the ski pole throughout a complete revolution of ski pole movement may be measured directly or indirectly via any suitable number and/or type of sensors that are mounted to or otherwise integrated into the ski pole 104. For example, the ski pole 104 may include an electronic level that measures the angle $\gamma$ of the ski pole 104 relative to the world frame of reference. To provide another example, the ski pole 104 may include a gyroscope to measure the angular rate of change, which may be integrated to obtain the instantaneous pole angle. In other embodiments, angular acceleration may be measured using, for example, an angular accelerometer or a pair of linear accelerometers, and the measurement may be integrated twice to obtain instantaneous pole angle.

To provide an illustrative example using a pair of linear accelerometers with reference to FIG. 1B, embodiments include the ski pole 104 including a first and a second linear accelerometer at the top of the ski pole 104 spaced apart by a distance 'd.' Let $a_A$ and $a_U$ be the orthogonal linear acceleration components of the upper accelerometer in the ski pole 104, with $a_A$ being collinear with ski pole 104. Furthermore, let $a_L$ be the parallel acceleration component to $a_U$, with $a_L$ being associated with the lower linear accelerometer. In this scenario, $a_U$ and $a_L$ are tangential accelerations when the ski pole 104 is rotated about its pivot point in the ground (the pole tip or basket). In this scenario, the angular acceleration a (alpha) as a function of time is defined by Eqn. 4 below:

$$\alpha(t) = \frac{\alpha_U(t) - \alpha_L(t)}{d} \qquad \text{Eqn. 4}$$

The angular velocity may then be represented by Eqn. 5 below:

$\omega(t) = \int \alpha(t)dt + \omega_0$; $\omega(t)_{avg} \cong 0$ over a complete revolution of ski pole movement for 0 seconds to $T$ seconds (assuming approximately same pole angular position at the beginning and end of the cycle). Eqn. 5:

Therefore, integrating from 0 to time T (complete revolution of ski pole movement) yields Eqn. 6 below:

$$\omega_0 = -\frac{1}{T}\int_0^T \alpha(t)dt \qquad \text{Eqn. 6}$$

If $\phi_0$ is the ski pole angle at the beginning of the complete revolution of ski pole movement and equals 0, then the angular position of the ski pole relative to pole position at the beginning of the complete revolution of ski pole movement, as a function of time, during the complete revolution of ski pole movement may be defined as shown in Eqn. 7 below:

$\phi(t) = \phi(t) = \int \omega(t)dt$ Eqn. 7:

Combining Eqn. 7 above with Eqns. 5 and 6 for angular velocity yields Eqn. 8 below:

$$\phi(t) = \int \left(\int \alpha(t)dt - \frac{1}{T}\int_0^T \alpha(t)dt\right)dt; \qquad \text{Eqn. 8}$$

Where $\phi(t)$ is the instantaneous ski pole angle relative to the pole angle at the beginning of the measurement cycle. Furthermore, $a_A'(t)$ and $a_U'(t)$, which are the acceleration components from the ski pole reference frame translated into the ski pole reference frame at the start of the measurement cycle (i.e., the start of the frame), may be represented as Eqns. 8 and 9 below:

$a_A'(t) = a_A \cos \phi(t) - a_U \sin \phi(t)$ Eqn. 8:

$a_U'(t) = a_A \sin \phi(t) + a_U \cos \phi(t)$ Eqn. 9:

The use of the prime marking denotes acceleration components in the world reference frame. Thus, the instantaneous pole angle relative to the world reference frame as shown in FIGS. 1A-1B is provided by Eqn. 10 below:

$\gamma(t) = \gamma_0 - \phi(t)$; where: Eqn. 10:

$$\gamma_0 = \tan^{-1}\left[\frac{\int_0^T a_A'(t)dt}{\int_0^T a_U'(t)dt}\right];$$

To determine the ground inclination $\beta$, the skier's vertical and horizontal speed may be measured over a complete revolution of ski pole movement (or during any suitable sampling interval, i.e., frame, within the complete revolution of ski pole movement). In various embodiments, which are further discussed below, any suitable number and/or type of sensors (e.g., radar, a GPS receiver, etc.), may be utilized to directly or indirectly measure the skier's speed. For example, in some embodiments, changes in the skiers' position over time may be tracked to calculate the skiers horizontal speed ($V_H(t)$) and vertical speed ($V_v(t)$) (e.g., by analyzing changes in geographic position over time and/or changes in barometric pressure). In other embodiments, the skier's speed may be determined directly (e.g., via a radar sensor) or identified in movement data provided by a GPS receiver. In any event, the ground inclination β as a function of time may be represented by Eqn. 11 below:

$$\beta(t) = \tan^{-1} \frac{V_V(t)}{V_H(t)}; \qquad \text{Eqn. 11}$$

or alternatively as $$\beta(t) = \tan^{-1} \frac{\Delta d_V(t)}{\Delta d_H(t)},$$

where 'd' refers to skier's position in world frame of reference.

Thus, the instantaneous pole angle θ(t) relative to the skier's direction of travel may be represented by Eqn. 12 below as follows:

$$\theta(t) = \gamma(t) - \beta(t); \qquad \text{Eqn. 12}$$

In an embodiment, the skier's velocity $v_s$ as a function of time may also be calculated independently of the ground inclination β, as shown in Eqn. 13 below:

$$v(t)_S^2 = V_H^2(t) + V_V^2(t); \qquad \text{Eqn. 13}$$

$$v(t)_s = \sqrt{V_H^2(t) + V_V^2(t)}$$

The force exerted by the skier on or through the ski pole 104 may then be translated to a direction traveled by the skier using the pole angle θ(t) relative to the skier's direction of travel in accordance with Eqn. 2 above. Once known, the power exerted by the skier $P(t)_s$ may be calculated at any given time during a complete revolution of ski pole movement as shown in Eqn. 14 below:

$$P(t)_s = F(t)_s \cdot v(t)_s; \qquad \text{Eqn. 13}$$

$$P(t)_S = F_{Pole}(t) \cos \theta(t) \cdot v(t)_S$$

As noted above, $F_{Pole}$ represents a measured force exerted by the skier along the axis of the ski pole 104.

System Overview

Figure 2:
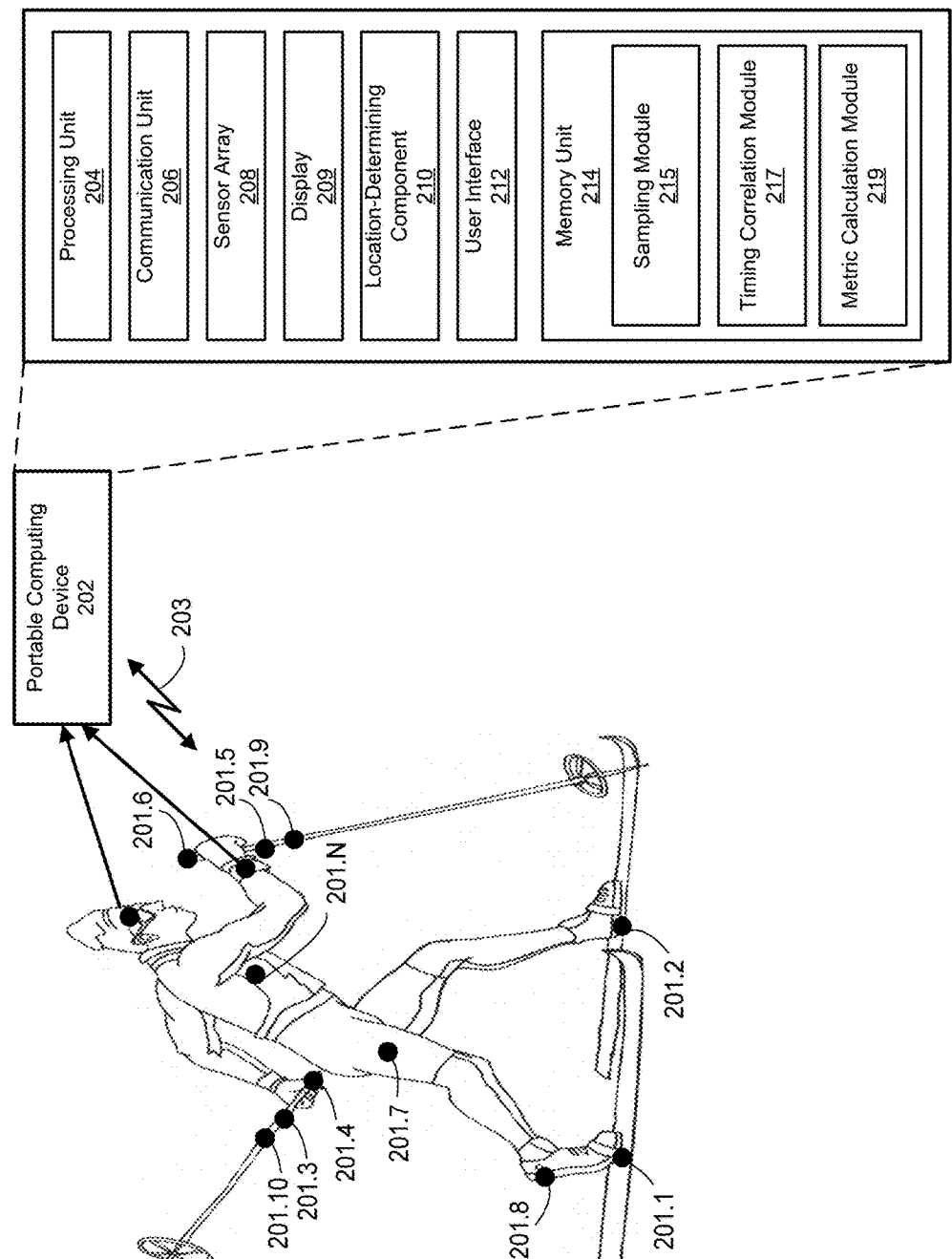
FIG. 2 is a block diagram example illustrating a ski power measurement system 200, according to an embodiment.

FIG. 2 is a block diagram example illustrating a ski power measurement system 200, according to an embodiment. Ski power measurement system 200 includes any suitable number N of sensor units 201.1-201.N and a portable computing device 202. Although FIG. 2 shows various sensor units 201.1-201.N mounted to the skiing components in a substantially symmetrical manner, embodiments include one or more sensor units 201.1-201.N being mounted in various skiing components in any suitable configuration. One or more sensor units 201.1-201.N may include a load sensor substrate and a load measurement device. The load measurement device may output a voltage indicative of strain of the load sensor substrate when force is applied to the substrate.

For example, in some embodiments, one or more of sensor units 201.1-201.N may be mounted in each ski, each boot, each binding, each ski pole, etc. But in other embodiments, one or more of sensor units 201.1-201.N may be mounted in one ski pole, in one boot, in one binding, in one ski, etc. In embodiments in which one or more of sensor units 201.1-201.N are mounted in a single skiing component (e.g., one ski pole instead of both ski poles), symmetry may be assumed when calculating the skier's generated power by doubling the measurements made with respect to the single ski component. Such embodiments may be particularly useful to facilitate lower-cost systems by implementing less sensor units.

In some embodiments, asymmetry of one or more calculated or measured metrics is calculated and presented to the user. For example, power transferred through the left ski pole may be compared to power transferred through the right ski pole. The comparison may be a difference, ratio or another function of the left and right-pole powers. An asymmetry metric may, for example, provide information about injury, excessive effort (resulting in loss of form), need to strengthen particular muscles.

In an embodiment, portable computing device 202 wirelessly receives sensor data from one or more of sensor units 201.1-201.N and utilizes this sensor data to determine the power generated by the skier while skiing. To do so, ski power measurement system 200 may implement different types of sensors as part of sensor units 201.1-201.N, which may be mounted to or otherwise located in or on the ski equipment or the skier to generate and transmit relevant sensor data. Although the sensor units 201.1-201.N are shown in FIG. 2 as separate units, embodiments include any suitable number of sensor units 201.1-201.N being integrated into a single sensor module. For example, a sensor module may be integrated as part of a ski pole and include any suitable number of sensor units 201.1-201.N. That is, a sensor module in the ski pole may house sensor units 201.3 and 201.4. Additionally or alternatively, portable computing device 202 may include various sensor units as part of sensor array 208, which is further discussed below.

For ease of explanation, the details of the sensor data processing utilized to calculate the power generated by the skier are described with reference to portable computing device 202. However, embodiments also include similar or identical operations being performed by any one of sensor units 201.1-201.N or the sensor modules (not shown) in which sensor units 201.1-201.N are housed. For example, a sensor module in a ski pole may house sensor units 201.3 and 201.4, as noted above. Although not shown in FIG. 2 for purposes of brevity, such a sensor module may include the same or similar components as portable computing device 202 such as processors, wireless transceivers, memory, power sources, etc., to perform the same types of calculations using measured sensor data as portable computing device 202. In embodiments, sensors 201.1-201.N and/or portable computing device 202 exchange sensor data and/or intermediate results of the power calculation. For example, the portable computing device 202 may include a GPS sensor and/or a barometer, and use these sensors to calculate skier's vertical and horizontal speeds ($V_V$, $V_H$) and communicate $V_V$ and $V_H$ to a sensor module containing the pole axial force sensor. The sensor module containing the pole axial force sensor then uses $V_V$ and $V_H$, together with other sensor data, to calculate skier's power. The sensor module containing the pole axial force then sends the calculated skier's power to the portable computing device 202 for display to the skier. Broadly, the distribution of the calculation procedure amongst the various system components is designed to optimize system performance (to, for example, minimize system power consumption, minimize cost or maximize system reliability).

Furthermore, only a portion of sensor units 201.1-201.N may be used depending on the particular implementation of ski power measurement system 200 and/or the specific type of skiing metrics that are measured. For example, for upper body power calculations, sensor units 201.1-201.2, which may be mounted within the skis, may not be present (or their measured data may not be used for upper body power calculations). To provide another example, for lower body power calculations, sensor units 201.3-201.6 may not be present. Of course, embodiments also include portable computing device 202 using a combination of both sets of sensor units (e.g., in the skis and the ski poles) to perform both upper and lower body power calculations.

Additionally or alternatively, some of sensor units 201.1-201.N may be configured to generate and/or transmit sensor data related to metrics other than the skier's power generation. For example, sensor unit 201.7 may be mounted to the skier's legs and configured as any suitable number and/or type of sensor (e.g., one or more accelerometers) to measure metrics such as the position, angle, velocity, and acceleration of the skier's legs while skiing. To provide another example, sensor unit 201.N may be mounted to the skier's chest and configured as any suitable number and/or type of sensor to measure metrics such as the position, angle, velocity, and acceleration of the skier's torso while skiing. In this way, ski power measurement system 200 may provide feedback regarding other types of skiing metrics in addition to the calculation of power exerted by the skier. The skier may then view these metrics while skiing or afterwards to improve his technique. Such metrics may be particularly useful, for example, when the skier is participating in a particular style of skiing for which the skier's form is important, such as cross-country skiing.

As further discussed below with reference to portable computing device 202, sensor array 208 may include any suitable number and/or type of sensor units to measure various sensor metrics. Furthermore, in various embodiments, any of sensor units 201.1-201.N may be included as part of sensor array 208. Therefore, although some example implementations are provided with reference to sensor units 201.1-201.N, it will be understood that one or more of sensor units 201.1-201.N may implement additional, similar, or alternative sensors than those implemented by sensor array 208.

Additionally, various embodiments of ski power measurement system 200 include sensor units 201.1-201.N and portable computing device 202 having varying levels of functionality. For example, in some embodiments, one or more or sensor units 201.1-201.N may measure sensor metrics and transmit the raw sensor data via a coupled wireless transceiver, which is not shown in FIG. 2 for purposes of brevity. In accordance with such embodiments, portable computing device 202 may receive the raw sensor data and analyze it to determine the respective sensor metric measured by that particular sensor. In other embodiments, one or more of sensor units 201.1-201.N may process the raw sensor data and transmit processed sensor data, which may include the actual measured metric values instead of the raw data. In accordance with such embodiments, the portable computing device 202 may receive the processed sensor data from respective sensor units and determine the measured metric value that was encoded into the data transmission. In yet other embodiments, raw data is measured on the portable computing device 202 and is transmitted to the one or more sensor units 201.1.201.N where it is used in combination with raw data measured on the sensor unit to calculate metric values, which are subsequently transmitted to the portable computing device 202. For example, the portable computing device 202 may utilize a GPS receiver to measure horizontal and vertical speeds of the user, send these speeds to the sensor unit mounted in the pole which combines it with force and acceleration measurements to calculate pole power, and the pole power is transmitted back to the portable computing device 202. In this way, sensor units 201.1-201.N and portable computing device 202 may be implemented with different levels of processing resources based upon design and marketing tradeoffs such as cost, battery life, etc.

Similar to the sensors implemented via sensor array 208, sensor units 201.1-201.N may also include any suitable number and/or type of sensors configured to measure various sensor metrics. These sensor metrics may be measured and/or generated based upon the particular mounting configuration and implementation of each sensor. For example, sensor units 201.3-201.4 may be implemented as a pair of linear accelerometers, or one of sensor units 201.3-201.4 may be implemented as an angular accelerometer, as discussed above with reference to FIGS. 1A-1B. Additionally or alternatively, one or more of sensor units 201.9-201.10 may include a gyroscope configured to measure the rotation and angular velocity in which a ski pole is moved while the skier is skiing.

In various embodiments, one or more of sensor units 201.1-201.N may be implemented as a sensor device configured to measure the movement of the skier in a direction of travel while skiing, to generate movement data indicative of the skier's movement in a particular direction, and/or to transmit the movement data. To provide an illustrative example, sensor unit 201.N or sensor unit 201.7 may be implemented as a radar unit configured to transmit radar signals and to receive radar signal reflections while the skier is skiing. The movement data in this case may include the timing of the radar signal reflections, which may be analyzed by the sensor unit (or transmitted to portable computing device 202 for analysis) to calculate the skier's movement and/or velocity in a particular direction of travel.

To provide another illustrative example, sensor unit 201.N or sensor unit 201.7 may be implemented as one or more accelerometers configured to measure the acceleration of the skier in one or more axes. In this scenario, the one or more accelerometers may generate movement data that is indicative of changes in the skier's geographic position in a particular direction of travel over time. That is, when one or more of sensor units 201.1 is implemented as an accelerometer-based sensor, the movement data may include the skier's measured acceleration in one or more axes, which may be analyzed by the sensor unit (or transmitted to portable computing device 202 for analysis) to calculate the skier's movement and/or velocity in a particular direction of travel. This movement data may be used to determine a velocity of the skier in a direction of travel.

To provide yet another illustrative example, sensor unit 201.N or sensor unit 201.7 may be configured as a stand-alone global navigation satellite receiver (GNSS) (e.g., a GPS receiver) configured to generate movement data that is indicative of changes in the skier's geographic location and/or elevation over time. That is, when one or more of sensor units 201.1 is implemented as an GPS-based sensor, the movement data may include two-dimensional or three-dimensional (with elevation being the third dimension)

geographic coordinates that track the skier's movement over time, which can be analyzed to calculate the skier's movement and/or velocity in a particular direction of travel. For example, the operation of one or more of sensor units 201.1-201.N as a standalone GNSS receiver may be substantially similar in function to that of location determining component 210, which is part of portable computing device 210 and further discussed below. However, embodiments in which one or more of sensor units 201.1-201.N functions as a standalone GNSS receiver may be particularly useful, for example, when portable computing device 202 is not configured with a location determining component and instead receives the location data as a wireless transmission from one or more of sensor units 201.1-201.N.

In embodiments where one or more sensor units 201.1 is implemented as a GPS-based sensor (a GPS receiver), the movement data may include a velocity in a direction of travel. The portable computing device 202 may determine a speed based on the movement of the skier in the direction of travel by identifying the velocity in a direction of travel provided in movement data received from sensor unit 201.1.

To provide an additional illustrative example, sensor unit 201.N may be mounted on the skier's chest and implemented as an accelerometer, gyroscope, magnetometer, etc., configured to measure the position, angle, velocity, acceleration, etc., of the skier's torso while skiing. As discussed above, such embodiments may be useful for providing metrics related to upper body power measurements, technique identification, technique improvement metrics and/or additional metrics used to quantify the skier's biomechanical output.

As discussed above, the power generated by the skier may be measured by determining the force exerted by the skier in the skier's direction of travel over each compete revolution of ski pole movement. Therefore, various embodiments include one or more of sensor units 201.1-201.N being implemented as any suitable type of sensor configured to measure force in one or more directions depending on the particular ski component in which the sensor unit is mounted. In various embodiments, one or more of sensor units 201.1-201.N may be implemented as a sensor device configured to measure force and/or strain in any suitable number of directions with reference to the mounted location of the sensor unit, to generate force data indicative of the measured force, and/or to transmit the force data.

For example, one or more of sensor units 201.1-201.N may be implemented as a strain gauge configured to use a change in resistance of a wire, or other conductive substrate such as silicon, of a known length as it stretches to determine the change in length of the material to which the wire is mounted. To provide another example, one or more of sensor units 201.1-201.N may be implemented as a capacitive strain gauge configured to use a change in capacitance between two parallel plates that grow closer together or further apart as force is applied. To provide an additional example, one or more of sensor units 201.1-201.N may be implemented as a hall effect sensor configured to measure a change in magnetic field as a result of a magnet moving when force is applied. To provide a further example, one or more of sensor units 201.1-201.N may be implemented as a pressure sensor configured to measure a change in pressure inside a sealed volume to estimate volumetric change when force is applied, similar to a hydraulic cylinder. To provide even more examples, one or more of sensor units 201.1-201.N may be implemented as an optical sensor configured to measure a change in light transmittance through a polarized lens as a result of the change of distance between the lens and light source, or as a piezoelectric sensor configured to measure a current produced by a piezoelectric crystal when pressure is exerted on it.

With further reference to force and/or strain-measuring sensors, embodiments include ski power measurement system 200 implementing such sensors (which may include the aforementioned examples or alternate ones) being configured to measure the force exerted on or through various ski components to determine the power generated by the skier. For example, one or more of sensor units 201.1-201.N (e.g., one of sensor units 201.9-201.10) may be configured to measure the axial force exerted on or through a ski pole, the force exerted by a skier on or through other axes and/or portions of a ski pole, and/or bending moments in a ski pole. To provide another example, one or more of sensor units 201.1-201.N (e.g., one of sensor units 201.1, 201.2, and/or 201.8) may be configured to measure the force exerted by a skier in one or more axes through the ski boot.

Again, to calculate the power generated by the skier the force exerted by the skier in the skier's direction of travel is determined, which utilizes the angle of the ski pole with respect to the ground. Therefore, in various embodiments, one or more of sensor units 201.1-201.N may be implemented as a sensor device configured to measure the movement and/or angle of the ski pole over time, to generate ski pole angle data indicative of the movement and/or angle of the ski pole, and/or to transmit the ski pole angle data. To provide an illustrative example, sensor unit 201.10 and/or sensor unit 201.9 may be implemented as an electronic level configured to measure the angle of the ski pole with respect to ground at various time intervals (e.g., during a complete revolution of ski pole movement). Thus, in this example, the ski pole angle data may include the actual angle of the ski pole with respect to horizontal ($\gamma$). The ski pole angle data may be analyzed by the sensor unit (or transmitted to portable computing device 202 for analysis) to calculate the angle of the ski pole with respect to the terrain ($\theta$) that is being skied over at any time depending on the sampling rate implemented by the sensor unit.

To provide another illustrative example, sensor units 201.3-201.4 and/or sensor units 201.5-201.6 may be implemented as a pair of linear accelerometers configured to measure the linear acceleration of the ski pole. Alternatively, one or more of sensor units 201.3-201.6 may be implemented as an angular accelerometer. In these examples, the ski pole angle data may include the linear or angular acceleration of the ski pole over time, as the case may be. The ski pole angle data may then be analyzed by the sensor unit (or transmitted to portable computing device 202 for analysis) to calculate the ski pole angle at any point in time in accordance with the instantaneous pole angle function $\theta(t)$, which may be determined in accordance with Eqns. 4-12 as discussed above.

To provide yet another illustrative example, sensor unit 301.9 and/or sensor unit 201.10 may be implemented as a gyroscope configured to measure the angular acceleration of the ski pole. In this scenario, the ski pole angle data may indicate the angular velocity of the ski pole over time. The ski pole angle data may then be analyzed by the sensor unit (or transmitted to portable computing device 202 for analysis) to calculate the ski pole angle at any point in time in accordance with the instantaneous pole angle function $\theta(t)$, which may be determined in accordance with Eqn. 7 as discussed above.

As further discussed below, in embodiments, the portable computing device 202 may be configured to wirelessly receive data transmitted from one or more sensor units 201.1-201.N, to determine various skiing metrics related to upper body power and/or lower body power measurements, and to present one or more skiing metrics on a display (e.g., display 209, as shown in FIG. 2). Again, the data received from one or more sensor units 201.1-201.N may include, for example, raw unprocessed sensor data, processed sensor measurements, the aforementioned movement data, force data, and ski pole angle data, or any other measured data regarding the movement of the skier, ski poles, and/or skis. Further details and examples of how this information is calculated are further discussed below with reference to FIGS. 3A-3D.

Sensor Mounting Configurations

Regarding the sensor units used to calculate upper body power measurements, FIG. 2 shows four sensor units 201.3-201.6. It will be understood, however, that ski power measurement system 200 may implement any suitable number and/or type of sensor units to perform such measurements. Furthermore, in various embodiments, sensor units 201.1-201.N may be mounted and/or configured in various manners depending on each sensor's specific implementation and the metrics measured by that particular sensor unit. For example, one of sensor units 201.3-201.6 may include a sensor configured to measure the application of force, including any mechanical force, strain, displacement, and/or pressure, exerted by the skier on or through the ski pole, the movement and/or angle of the ski pole, the compression, tension, or both, along the axis of the ski pole, any combination of forces and/or moments in any three dimensions of the ski pole, etc.

In an embodiment, one or more of sensor units 201.1-201.N may be located within (but not integrated) with the ski pole, in a removable manner to facilitate such measurements. For example, one or both of the ski poles may include one of sensor units 201.3-201.6 that is integrated into the housing of a conventional ski pole. This may be implemented, for example, by integrating the sensor unit housing between the ski pole grip and the ski pole shaft or by using the ski pole grip or shaft as the housing. In an embodiment, one or more of sensor units 201.3-201.6 may be part of a modular sensor module that is removably mounted to a conventional or specialized ski pole to allow the skier to easily separate the sensor module from the ski pole when not skiing. This removable mounting strategy provides many benefits to the skier such as interchangeability of poles, security, ease of charging, ease of storage, etc.

In embodiments, the removable coupling of one or more sensor units 201.1-201.N, from some or all of the components of a conventional ski pole, may be achieved through attachment methods not requiring the use of tools, for example, by integrating a threaded or rotatable coupling between the sensor unit(s) and the other portions of the assembly. In other embodiments, the removable coupling of one or more sensor units 201.1-201.N, from some or all of the components of a conventional ski pole, may be achieved using one or more cam locking collars. In some embodiments these locking collars or components of these locking collars, for example the lever arm, can be integrated or concealed within the ski pole grip.

In other embodiments, one or more of sensor units 201.3-201.6 may be located in a ski pole strap, which may be detachable and/or adjustable. For example, the sensor unit may be integrated within the grip of the ski pole or be placed in a strap-to-pole interlock between the grip and the strap. In such implementations, the sensor unit may be configured to measure tension applied between the strap and the ski pole grip.

In still other embodiments, one or more of sensor units 201.3-201.6 may be integrated as part of the ski pole. For example, the sensor unit may be fitted to conventional ski poles between the shaft and the grip when the ski poles are manufactured. To provide another example, the sensor unit may be integrated within the ski pole grip and/or the ski pole shaft to protect the sensor unit.

Regarding the sensor units used to calculation lower body power measurements, FIG. 2 shows three sensor units 201.1, 201.2, and 201.8. Again, it will be understood that ski power measurement system 200 may implement any suitable number and/or type of sensor units to perform such measurements. For example, one of sensor units 201.1, 201.2, and 201.8 may include a sensor configured to measure the application of force, including any mechanical force, strain, displacement and/or pressure, as it is transferred from the skier's foot to the snow (or other surface). In various embodiments, one or more sensor units may be located in the skis and/or the skier's boots in various implementations to facilitate these measurements.

For example, sensor unit 201.8 may be integrated into a portion of the boot such as the sole, pin, or heel to capture the skier's application of force. To provide another example, sensor units 201.1 and/or 201.2 may be integrated into a ski binding, such as the clamp holding the pin(s) of the boot, positioned in the rubber bumper of the binding, in the heel plate, etc. to capture the skier's application of force. Additionally or alternatively, sensor units 201.1 and/or 201.2 may be integrated into the ski itself (e.g., the ski core) to capture the skier's application of force.

To provide additional examples, sensor units 201.1 and/or 201.2 may be integrated into the binding latch plate to capture the skier's application of force. This could be implemented, for example, by integrating the sensor unit into the surface and rails of the binding latch plate to capture the skier's force applied to the binding.

To provide yet another example, sensor units 201.1 and/or 201.2 may be integrated into an additional sensor plate that is mounted to the ski (e.g., adjacent to the binding) or manufactured as part of the skis to capture the application of force. For instance, a sensor unit may be integrated into the surface and rails of the sensor plate to capture the skier's force applied to the binding. In embodiments implementing a sensor plate design, the sensor plate may be designed with sections that deform under loading, and sensors mounted to the plate may measure this deformation.

Portable Computing Device Operation

As shown in FIG. 2, the portable computing device 202 may be implemented as any suitable type of device configured to communicate with one or more of sensor units 201.1-201.N, to communicate with one or more other computing devices to transfer, upload, and/or share calculated skiing metrics, to receive data from one or more of sensor units 201.1-201.N (e.g., force data, movement data, and/or ski pole angle data), and/or to present various skiing metrics via display 209. For example, the portable computing device 202 may be implemented as a fitness-monitoring device worn on the skier's wrist (e.g., Garmin™ FENIX devices). To provide another example, the portable computing device 202 may be implemented as an in-sight display (e.g., Garmin™ VARIA devices) that presents skiing metrics to the skier.

Processing unit 204 may be implemented as any suitable type and/or number of processors, such as a host processor of portable computing device 202, for example. To provide additional examples, processing unit 204 may be implemented as an application specific integrated circuit (ASIC), an embedded processor, a central processing unit associated with portable computing device 202, etc. Processing unit 204 may be coupled with and/or otherwise configured to communicate, control, operate in conjunction with, and/or affect operation of one or more of communication unit 206, sensor array 208, display 209, location determining component 210, user interface 212, and/or memory unit 214 via one or more wired and/or wireless interconnections, such as any suitable number of data and/or address buses, for example. These interconnections are not shown in FIG. 2 for purposes of brevity.

For example, processing unit 204 may be configured to retrieve, process, and/or analyze data stored in memory unit 214, to store data to memory unit 214, to replace data stored in memory unit 214, to analyze sensor data received from one or more of sensor units 201.1-201.N and/or sensor array 208, to calculate various ski metrics based upon an analysis of sensor data received from one or more of sensor units 201.1-201.N and/or sensor array 208, to display various ski metrics via display 209, to interpret user input received via user interface 212, to control various functions of portable computing device 202, etc. Additional details associated with such functions are further discussed below.

Communication unit 206 may be configured to support any suitable number and/or type of communication protocols to facilitate communications between portable computing device 202 and one or more of sensor units 201.1-201.N. Communication unit 206 may be configured to facilitate the exchange of any suitable type of information between portable computing device 202 and one or more of sensor units 201.1-201.N (e.g., via link 203), and may be implemented with any suitable combination of hardware and/or software to facilitate such functionality. For example, communication unit 206 may be implemented with any number of wired and/or wireless transceivers, ports, connectors, antennas, etc. In an embodiment, communication unit 206 may function to enable portable computing device 202 to wirelessly connect to one or more of sensor units 201.1-201.N and to provide communications between portable computing device 202 and one or more of sensor units 201.1-201.N. Additionally or alternatively, communication unit 206 may be configured to support communications between portable computing device 202 and one or more other computing devices not shown in FIG. 2 for purposes of brevity, such as desktop computers, laptops, or smartphones, for example, to allow users to transfer skiing metrics to these devices. To facilitate communications between portable computing device 202, one or more of sensor units 201.1-201.N, and/or other computing devices, communication unit 206 may be configured to support communications in accordance with any suitable number and/or type of wired and/or wireless communication protocols. Examples of wireless communication standards that may be implemented by portable computing device 202 include, but are not limited to, communications according to: one or more standard of the Institute of Electrical and Electronics Engineers (IEEE), such as 802.11 or 802.16 (Wi-Max) standards; Wi-Fi standards promulgated by the Wi-Fi Alliance; ZigBee standards promulgated by the ZigBee Alliance; Bluetooth standards promulgated by the Bluetooth Special Interest Group; ANT or ANT+ standards promulgated by Dynastream Innovations, Inc.; and so on. Sensor array 208 may be implemented as any suitable number and/or type of sensors configured to measure, monitor, and/or quantify one or more environmental characteristics. These sensor measurements may result in the acquisition and/or generation of different types of sensor data, for example, which may be processed by processing unit 204. For example, sensor array 208 may include one or more accelerometers, radar sensors and/or transducers (which may utilize, e.g., radar, Light detection and ranging (Lidar), and/or ultrasonic sensors), gyroscopes, perspiration detectors, compasses, speedometers, magnetometers, barometers, thermometers, proximity sensors, light sensors (e.g., light intensity detectors), photodetectors, photoresistors, photodiodes, Hall Effect sensors, electromagnetic radiation sensors (e.g., infrared and/or ultraviolet radiation sensors), ultrasonic and/or infrared range detectors, humistors, hygrometers, altimeters, biometrics sensors (e.g., heart rate monitors, blood pressure monitors, skin temperature monitors), microphones, etc. Sensor array 208 (as well as one or more of sensor units 201.1-201.N) may be configured to sample sensor measurements and/or to generate sensor data continuously or in accordance with any suitable recurring schedule, such as, for example, on the order of milliseconds (e.g., 1 ms, 10 ms, 100 ms, etc.), once per every second, once every 5 seconds, once per every 10 seconds, once per every 30 seconds, once per minute, etc. Display 209 may be implemented as any suitable type of display configured to facilitate user interaction with portable computing device 202, such as a capacitive touch screen display, a resistive touch screen display, etc. In various aspects, display 209 may be configured to work in conjunction with user interface 212 and/or processing unit 204 to detect user inputs upon a user selecting a displayed interactive icon or other graphic, to identify user selections of objects displayed via display 209, etc.

Location-determining component 210 may receive signal data transmitted by one or more position data platforms and/or position data transmitters, such as Global Positioning System (GPS) satellites. More particularly, location-determining component 210 may manage and process signal data received from GPS satellites via a GPS receiver. Location-determining component 210 may thus determine a geographic position by processing the received signal data, which may include various data suitable for use in position determination, such as timing signals, ranging signals, ephemerides, almanacs, and so forth. In an embodiment, location determining component 210 may generate movement data indicative of changes in the skier's geographic position in the direction of travel, as discussed above with respect to one or more of sensor units 201.1-201.N. Location-determining component 210 may also be configured to provide a variety of other position-determining functionality. Location-determining functionality, for purposes of discussion herein, may relate to a variety of different navigation techniques and other techniques that may be supported by "knowing" one or more positions. For instance, location-determining functionality may be employed to provide position/location information, timing information, speed information, and a variety of other navigation-related data. Accordingly, location-determining component 210 may be configured in a variety of ways to perform a wide variety of functions. For example, location-determining component 210 may be configured for hiking or other on-foot navigation such as skiing; however, location-determining component 210 may also be configured for vehicle navigation or tracking.

Location-determining component 210, for example, can use signal data received via a GPS receiver in combination with map data that is stored in memory unit 214 to generate navigation instructions (e.g., turn-by-turn instructions to an input destination or POI), show a current position on a map, and so on. Location-determining component 210 may include one or more antennas to receive signal data. Location-determining component 210 may also provide other position-determining functionality, such as to determine an average speed, calculate an arrival time, and so on.

Although a GPS system is described in relation to FIG. 2, it should be apparent that a wide variety of other positioning systems may also be employed, such as other satellite systems (e.g., GNSS), terrestrial based systems (e.g., wireless-phone based systems that broadcast position data from cellular towers), wireless networks that transmit positioning signals, and so on. For example, positioning-determining functionality may be implemented through the use of a server in a server-based architecture, from a ground-based infrastructure, through one or more sensors (e.g., gyros, odometers, accelerometers and magnetometers), use of "dead reckoning" techniques, and so on. In other examples, positioning-determining functionality may be implemented through the use of predictive algorithms, utilizing previously collected positioning data for a specific path or trail.

User interface 212 may be configured to facilitate user interaction with portable computing device 202 and/or to provide user feedback. In some embodiments, a user may interact with user interface 212 to change various modes of operation, to initiate certain functions, to modify settings, set options, etc. For example, user interface 212 may include a user-input device such as an interactive portion of display 209 (e.g., a "soft" keyboard, buttons, etc.), physical buttons integrated as part of portable computing device 202 that may have dedicated and/or multi-purpose functionality, etc. To provide another example, user interface 212 may work in conjunction with a microphone that is implemented as part of sensor array 208 to analyze a user's voice and to execute one or more voice-based commands. Voice commands may be received and processed, for example, in accordance with any suitable type of automatic speech recognition (ASR) algorithm.

In accordance with various embodiments, memory unit 214 may be a computer-readable non-transitory storage device that may include any suitable combination of volatile (e.g., a random access memory (RAM), or non-volatile memory (e.g., battery-backed RAM, FLASH, etc.). Memory unit 214 may be configured to store instructions executable on processing unit 204. These instructions may include machine readable instructions that, when executed by processing unit 204, cause processing unit 204 to perform various acts as described herein. Memory unit 214 may also be configured to store any other suitable data used in conjunction with portable computing device 202, such as map data used for location-determining component 210, skiing metrics stored from previous skiing sessions, etc.

Sampling module 215 is a region of memory unit 214 configured to store instructions, that when executed by processing unit 204, cause processing unit 204 to perform various acts in accordance with applicable embodiments as described herein. In an embodiment, sampling module 215 includes instructions that, when executed by processing unit 204, cause processing unit 204 to receive, process, and/or store various sensor data to memory unit 214 in accordance with any suitable sampling schedule. In an embodiment, the sensor data stored in memory unit 215 may be analyzed to calculate and/or present various skiing metrics, as further discussed below and elsewhere herein.

For example, as discussed above, portable computing device 202 may receive sensor data from one or more sensor units 201.1-201.N and/or from one or more sensors implemented in sensor array 208. Portable computing device 202 may additionally receive sensor data (e.g., movement data including geographic coordinates) from location-determining component 210. In an embodiment, sampling module 215 may include instructions to facilitate the collection of sensor data from these various sensor sources continuously or in accordance with any suitable sampling schedule, which may depend upon the particular type of sensor from which the sensor data is collected. For example, one or more of sensor units 201.1-201.N may measure and transmit sensor data continuously (or as long as possible). However, one or more of sensor units 201.1-201.N and/or sensors implemented in sensor array 208 may also measure and transmit sensor data sensor units periodically, with some of sensor units 201.1-201.N and/or sensors implemented in sensor array 208 measuring and transmitting sensor data at different rates than others. Furthermore, sensor data may be received from location-determining component 210 continuously or at a rate that differs from sensor units 201.1-201.N and/or sensors implemented in sensor array 208.

In an embodiment, sampling module 215 may store instructions, that when executed by processing unit 204, cause processing unit 204 to identify when sensor data is received from each sensor source. To do so, sampling module 215 may include instructions that cause processing unit 204 to store received sensor data with a timestamp or other suitable time reference. For example, GNSS receivers are known to have highly accurate synchronized clocks. In an embodiment, sampling module 215 may store sensor data from each source with an indication of when the sampling data was sampled and/or received with reference to this clock (e.g., a clock implemented via location-determining component 210). To provide another example, sensor array 208 may implement a real-time clock or other suitable clock reference, and sampling module 215 may store sensor data from each sensor source with an indication of when the sampling data was sampled and/or received with reference to such a clock.

Furthermore, embodiments include sampling module 215 storing instructions, that when executed by processing unit 204, cause processing unit 204 to process received sensor data to determine sensor values, and to store these sensor values in memory unit 214 with a suitable time reference for further analysis, as further discussed below. For example, one or more of sensor units 201.1-201.N may include a force sensor unit that continuously (or periodically) measures the force exerted axially on or through the ski pole and transmits force data including the raw sensor data measurements. In such a case, embodiments include sampling module 215 storing instructions, that when executed by processing unit 204, cause processing unit 204 to analyze the force data to calculate the measured force values represented by the raw sensor data, and to store the calculated force values in memory unit 214. Similarly, embodiments include processing unit 204 executing instructions stored in sampling module 204 to analyze movement data and/or ski pole angle data from the various sensor sources discussed herein. Regardless of the type of sensor data and whether the sensor data is raw or processed data, embodiments include processing unit 204 executing instructions stored in sampling module 215 to store sensor data values associated with various sources of sensor data and a time reference to when the sensor data from each sensor source was received and/or measured.

Timing correlation module 217 is a region of memory unit 214 configured to store instructions, that when executed by processing unit 204, cause processing unit 204 to perform various acts in accordance with applicable embodiments as described herein. In an embodiment, timing correlation module 217 includes instructions that, when executed by processing unit 204, cause processing unit 204 to synchronize or correlate various stored sensor values to one another, which is used to calculate various metrics and to identify calculation frames (i.e., time intervals) of skiing movement.

For example, as described above, processing unit 204 may execute instructions stored in sampling module 215 to store sensor data in memory unit 214, with each sensor data value being associated with a particular time. In an embodiment, processing unit 204 may execute instructions stored in timing correlation module 217 to correlate sensor values stored in memory unit 214 to one another so that additional ski metrics may be calculated, as further discussed below.

Furthermore, as discussed above with reference to FIGS. 1A-1B, to facilitate some calculations such as the power generated by the skier, the dynamics of the skier's movement over a complete revolution of ski pole movement may be analyzed. Therefore, embodiments include processing unit 204 executing instructions stored in timing correlation module 217 to format the sensor values stored in memory unit 214 into individual calculation frames within each revolution of ski pole movement. In this way, the tracked sensor values at various instants in time over a complete revolution of ski pole movement may be correlated to other sensor values within each frame. In other words, each complete revolution of ski pole movement may include several calculation frames, with each frame including several time-correlated sensor values such as the measured axial force on or through the ski pole, the angular acceleration and/or velocity of the ski pole, the angle of the ski pole, the location and/or velocity of the skier in a particular direction of travel, etc.

In an embodiment, processing unit 204 may execute instructions stored in timing correlation module 217 to identify the starting and stopping point (i.e., times) associated with complete revolutions of ski pole movement (i.e., the ski poling phase). This may be identified, for example, by analyzing changes in the sensor values stored in memory unit 214 over time to determine the time intervals associated with individual ski pole strikes. For example, force data may be analyzed to identify changes in the force in excess of a particular force threshold value. To provide another example, the force data may be analyzed to determine whether a change in force exceeds a threshold change over a particular time interval. To provide yet another example, the changes of the axial force may be analyzed over time to identify a time interval between two successive force value "peaks." In any event, processing unit 204 may identify the time period associated with a complete revolution of ski pole movement and further divide this time period into several calculation frames, as further discussed below.

Metric calculation module 219 is a region of memory unit 214 configured to store instructions, that when executed by processing unit 204, cause processing unit 204 to perform various acts in accordance with applicable embodiments as described herein. In an embodiment, metric calculation module 219 includes instructions that, when executed by processing unit 204, cause processing unit 204 to calculate various skiing metrics using various types of sensor data and optionally cause display 209 to present these metrics. In some embodiments, processing unit 204 may execute instructions stored in metric calculation module 219 to analyze the various sensor values within each of the calculation frames identified via the execution of instructions stored in timing correlation module 217, as discussed above. In other embodiments, processing unit 204 may execute instructions stored in metric calculation module 219 to calculate skiing metrics without necessarily analyzing sensor values on a frame-by-frame basis. For example, ski metrics such as the power generated by the skier during each complete revolution of ski pole movement may utilize a frame-by-frame analysis of correlated sensor values sampled over the complete poling phase. But other metrics, such as the skier's current geographic location, for example, may not require a frame-by-frame analysis and instead be determined directly from sensor data at any particular time. Yet other metrics, such as barometric pressure measurements, may be sampled at a greater frequency than a frame-by-frame analysis and may be averaged, combined or compared with other data sources for improving measurement accuracy over a given time.

Regarding the calculation of ski metrics related to the power generated by the skier, illustrative examples are described below with reference to FIGS. 3A-3D. Although FIGS. 3A-3D illustrate the sampling of skiing metrics related to upper body power measurements, it will be understood that embodiments include portable computing device 202 sampling and storing sensor data from any suitable number of sensors (e.g., one or more of sensor units 201.1-201.N, one or more sensors implemented in sensor array 208, location-determining component 210, etc.).

Furthermore, several assumptions may be made to simplify the calculations of the power generated by the skier. For example, when calculating upper body power using the force exerted by the skier on or through the ski pole, friction and losses in the pole may be ignored. Additionally, movement of the ski poles that are not aligned with a plane defined by skier's velocity vector and gravity vector may also be ignored, thereby allowing more simplified power calculations by assuming two-dimensional motion as opposed to three dimensional motion of the skier and the ski poles. Additionally, and as discussed above, a simplification to the calculation of power generated by the skier during a complete revolution of ski pole movement may be calculated by assuming symmetrical power in each ski pole. In this way, embodiments allow for sensor data associated with a single ski pole to be analyzed to determine the power exerted by the skier on or through one ski pole, and doubling this calculated value to determine an estimated average of the power exerted by the skier on or through both ski poles. However, it is understood that not making one or more of the simplifications may improve the accuracy of the calculated results, possibly at a cost of increased power consumption and/or system complexity.

FIGS. 3A-3D illustrate skiing metrics obtained from various sensors and/or calculated from other metrics, which are shown on the same time scales. For purposes of brevity, FIGS. 3A-3D illustrate skiing metrics related to several complete revolutions of ski pole movement, as discussed below. However, the techniques described herein are applicable to skiing metrics measured over any suitable time period and/or may be extended to measure lower body metrics as well as the upper body metrics discussed below.

Figure 3A:
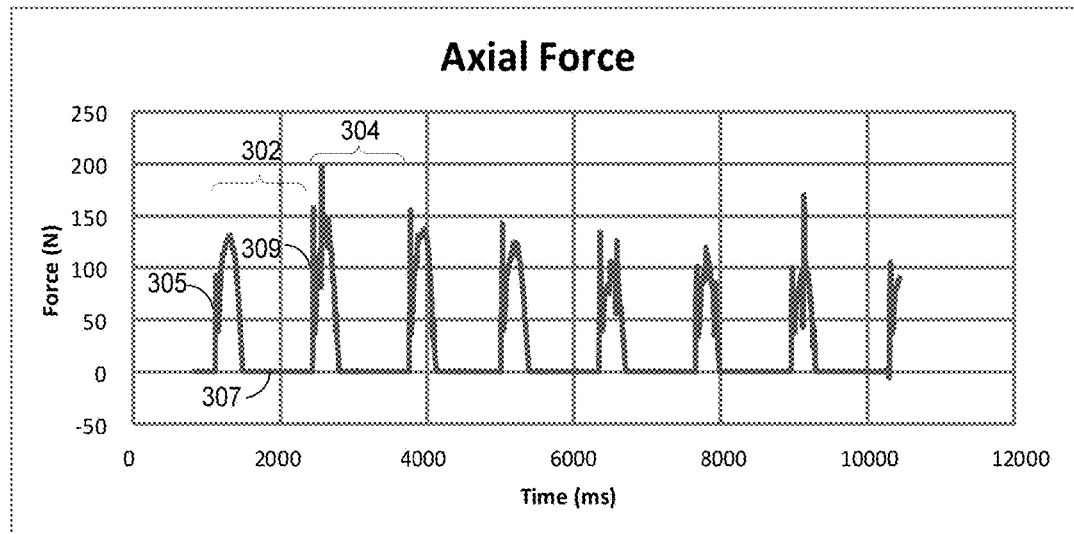
FIG. 3A is a graphical representation illustrating the measured axial force exerted on or through the ski pole over several complete revolutions of ski pole movement, according to an embodiment.

FIG. 3A is a graphical representation illustrating the measured axial force exerted on or through the ski pole over several complete revolutions of ski pole movement, according to an embodiment. The measured axial force shown in FIG. 3A may be based upon or otherwise derived from the force data discussed above. As shown in FIG. 3A, the axial force over time is measured in Newtons (N), which may represent the sensor values stored in memory unit 214 once received from a suitable force-based sensor in the ski pole. The data shown in FIG. 3A may correspond to the actual values represented by such a force-based sensor once the data is received by portable computing device 202 and analyzed (e.g., via processing unit 202 executing instructions stored in sampling module 215). Furthermore, the force values shown in FIG. 3A may be correlated to a suitable time reference (e.g., via processing unit 202 executing instructions stored in timing correlation module 217), allowing each interval over several complete revolutions of ski pole movement to be correlated to the particular instant in time associated with the measured axial force value.

For example, FIG. 3A shows the axial force exerted on or through the ski pole over two successive poling phases 302 and 304, each of which represents a complete revolution of ski pole movement. With reference to poling phase 302, time interval 305 indicates the beginning of the poling phase where the ski pole initially contacts the ground, which occurs at time of approximately 123,000 ms (123 seconds) relative to some known reference time (e.g., the start of a skiing session). The force measured by the force sensor indicates a significant axial force (e.g., peak) on or through the ski pole, which is followed by a time interval 307, in which the axial force is near-zero once the ski pole is lifted off the ground. Once the skier plants the ski-pole again at time interval 309, this ends the poling phase 302 and starts the next poling phase 304. Each ski poling phase over a skiing session, or each complete revolution of ski pole movement, may be represented in this manner. While in this example each ski poling phase starts with the user planting the ski pole, generally the start of the ski poling phase for the purposes of subsequent calculations may be any moment during a revolution of ski pole movement, as long as substantially the same feature of the revolution of ski pole movement is chosen for successive phases. For example, the start of each ski poling phase may be chosen as the moment the ski pole leaves the ground, or just after the pole is planted into the ground.

As shown in FIG. 3A, each complete revolution of ski pole movement occurs over a time interval of approximately one-and-a-half seconds. Using poling phase 302 as an example, the power generated by the skier may be calculated over this complete revolution of ski pole movement by further dividing poling phase 302 into several calculation frames. These calculation frames may be of any suitable length depending on the granularity in which the sensor data is sampled within each complete revolution of ski pole movement. For example, poling phase 302 may be divided into several calculation frames (e.g., 100, 200, 500, 1000, etc.), with a higher number of calculation frames providing more accurate ski power calculations but requiring additional processing time and resources to do so.

Figure 3B:
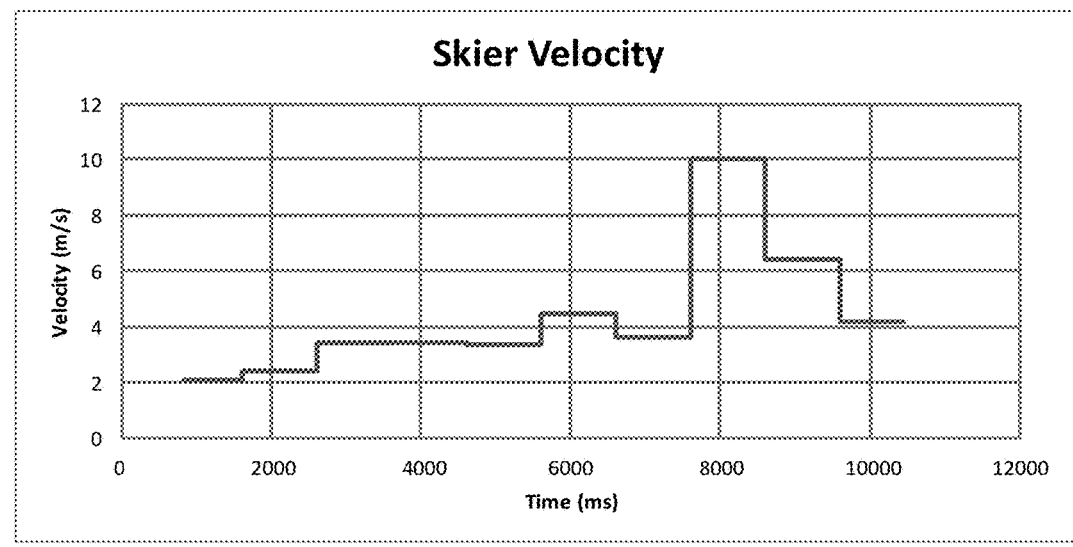
FIG. 3B is a graphical representation illustrating a skier's velocity over several complete revolutions of ski pole movement, according to an embodiment.

FIG. 3B is a graphical representation illustrating a skier's velocity over several complete revolutions of ski pole movement, according to an embodiment. The measured velocity shown in FIG. 3B may be based upon or otherwise derived from the movement data discussed above. The skier's velocity as shown in FIG. 3B represents the skier's speed in his direction of travel and varies over several complete revolutions of ski pole movement between 10 meters per second (m/s) and 2 m/s. As shown in FIG. 3B, the skier's velocity is correlated to the same time intervals shown in FIG. 3A, such that the skier's velocity at any poling phase (or calculation of frames within each poling phase) may be correlated to the axial force exerted by the skier at that same time instant. As discussed above, however, the vector component of this axial force that corresponds to the skier's direction of travel is used to calculate the power exerted by the skier during a complete revolution of ski pole movement. The calculation of this vector component of the axial force is further discussed below with reference to FIG. 3C and FIG. 4.

In various embodiments, the skier's velocity as shown in FIG. 3B may represent the skier's velocity with respect to the horizontal (i.e., the world frame) or with respect to the ground upon which the skier is skiing (i.e., the skier frame). For example, a radar-based sensor or MEMS-based sensor (e.g., one or sensor units 201.1-201.N) may measure the skier's speed relative to the skier's frame of reference. A GPS-based sensor that measures changes in the skier's movement over time, however, may measure the speed and/or changes in the skier's position with respect to the vertical and the horizontal world frame of reference.

In the event that the skier's speed is initially measured relative to the world frame (i.e., the vertical and the horizontal), embodiments include processing unit 204 executing instructions stored in metric calculation module 219 to translate the skier's speed to be relative to the ground upon which the skier is skiing (i.e., to provide the skier's velocity $v_s$). For example, referring back to FIG. 1A, the skier may be skiing on an inclination angle $\beta$. Thus, the skier's velocity $v_s$ may be calculated by determining changes in this inclination angle $\beta$ as a function of time (e.g., as shown and discussed with reference to Eqn. 11) or independently of the inclination angle $\beta$ (e.g., as shown and discussed with reference to Eqn. 13).

Figure 3C:
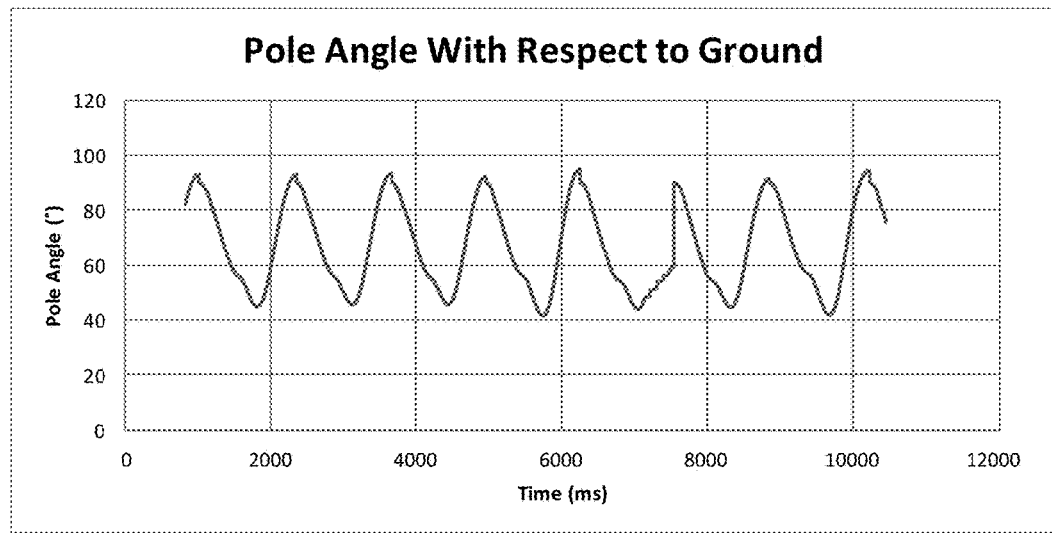
FIG. 3C is a graphical representation illustrating the measured ski pole angle with respect to ground over several complete revolutions of ski pole movement, according to an embodiment.

FIG. 3C is a graphical representation illustrating the measured ski pole angle with respect to ground over several complete revolutions of ski pole movement, according to an embodiment. The measured ski pole angle shown in FIG. 3C, based upon or otherwise derived from the ski pole angle data discussed above, may be determined using a sensor unit. Again, to calculate the power exerted by the skier in a direction of travel during a complete revolution of ski pole movement, the vector component of force exerted by the skier in that same direction of travel is first calculated. To do so, embodiments include correlating the axial force exerted by the skier on or through the ski pole to the angle of the ski pole relative to the ground over a complete revolution of ski pole movement. FIG. 3C shows the changes in the ski pole angle with respect to the ground over each complete revolution of ski pole movement, which is provided on the same time scale as the axial force exerted by the skier on or through the ski pole shown in FIG. 3A.

The ski pole angle with respect to ground, as shown in FIG. 3C, may be calculated in various ways depending on the particular implementation of sensor units from which ski pole angle data is obtained, as discussed above with reference to Eqns. 4-10 and 12. For example, the ski pole angle data may be received from a sensor unit including dual linear accelerometers, a gyroscope, a single angular accelerometer, any combination thereof, etc. In embodiments, processing unit 204 may execute instructions stored in metric calculation module 219 to determine the angular acceleration of the ski pole as a function of time and derive the instantaneous pole angle relative to the world frame of reference in accordance with Eqns. 5-10 (or Eqns. 4-10, in the case of dual linear accelerometers). Once the instantaneous pole angle relative to the world frame of reference is calculated, it may be translated relative to the skier's direction of travel in accordance with Eqn. 12, i.e., by subtracting out the inclination angle $\beta$.

And once the pole angle with respect to ground is determined over a complete revolution of ski pole movement, the vector component of force exerted by the skier in the direction of travel may be obtained. In particular, the axial force at each time instant (e.g., over each calculation frame) within a complete revolution of ski pole movement from FIG. 3A may be multiplied by the cosine of the ski pole angle with reference to ground at each of the same time instants within the complete revolution of ski pole movement from FIG. 3B. Once the vector component of force exerted by the skier in the direction of travel is calculated, the power exerted by the skier in his direction of travel may be calculated in accordance with Eqn. 3. That is, the skier's velocity at one or more of the same time instants within a complete revolution of ski pole movement from FIG. 3C may be multiplied by the vector component of force exerted by the skier in the direction of travel during each of those respective time instants.

Figure 3D:
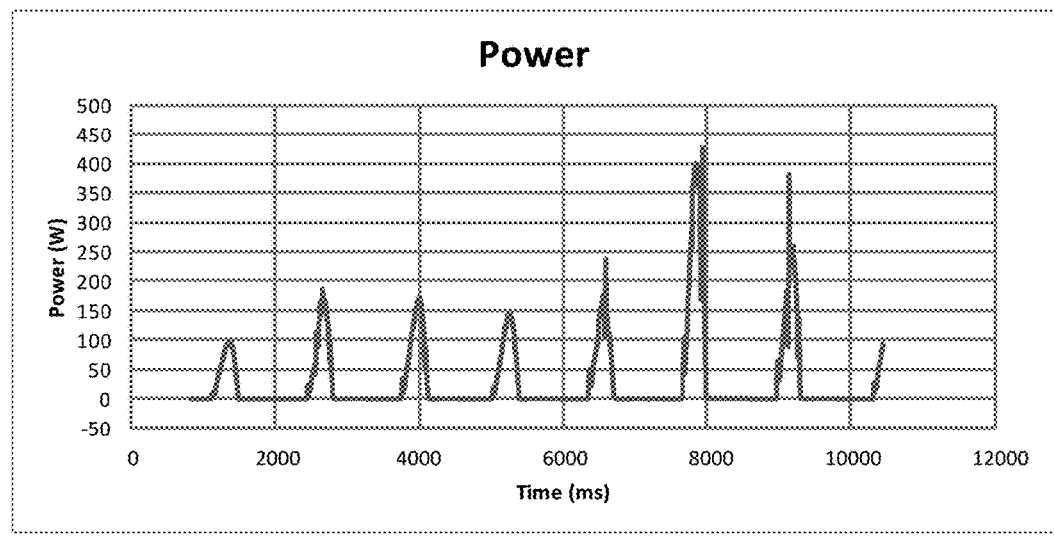
FIG. 3D is a graphical representation illustrating a skier's generated power over several complete revolutions of ski pole movement, according to an embodiment.

The resulting power calculated in this way is shown in FIG. 3D, which is a graphical representation illustrating a skier's generated power over several complete revolutions of ski pole movement, according to an embodiment. Once calculated, embodiments include portable computing device 202 presenting the skier's generated power over one or more complete revolutions of ski pole movement while the skier is skiing or after the skier has finished skiing. For example, display 209 may present the calculated power generated by the skier during the complete revolution of ski pole movement on an individual basis as the skier is skiing. Alternatively, portable computing device 202 may aggregate the power generated by the skier over several complete revolutions while skiing to update the display with the average power generated by the skier over the skiing session.

Figure 4:
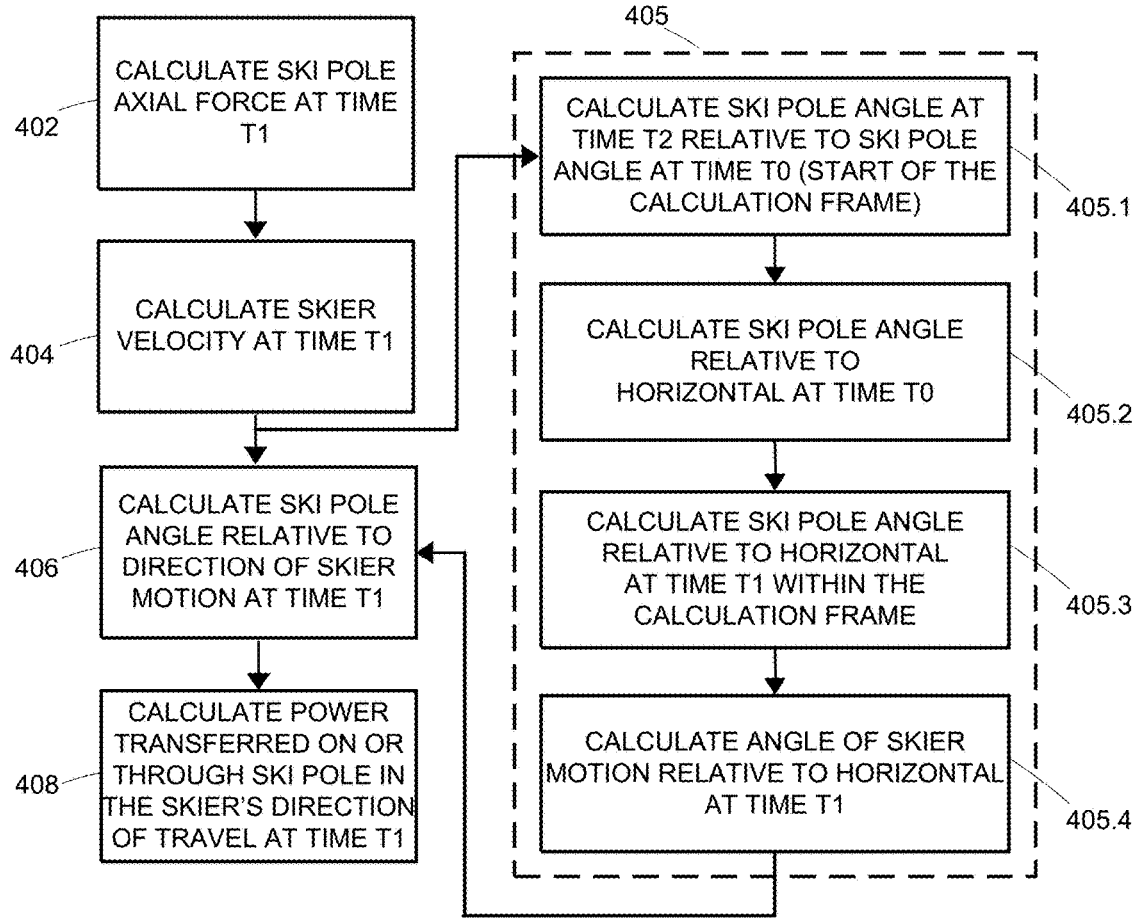
FIG. 4 illustrates a method flow 400, according to an embodiment.

FIG. 4 illustrates a method flow 400, according to an embodiment. In various embodiments, one or more regions of method 400 (or the entire method 400) may be implemented by any suitable device. For example, one or more regions of method 400 may be performed by portable computing device 202 and/or one or more of sensor units 201.1-201.N, as shown in FIG. 2. Method 400 represents the calculations performed during a single calculation frame within a complete revolution of ski pole movement. For example, a complete revolution of ski pole movement (i.e., the poling phase) may take 2 seconds, but there may be several successive calculation frames included within this complete revolution of ski pole movement. In other words, the calculations represented by method 400 may be with respect to a discrete time interval occurring within a complete revolution of ski pole movement. To calculate the power exerted by the skier over an entire revolution of ski pole movement, the power calculated for each calculation frame may be aggregated. Furthermore, the power calculated for several complete revolutions of ski pole movement may then be accumulated to determine the power generated by the skier over an entire skiing session or the average power exerted by the skier during each complete revolution of ski pole movement, which may be optionally presented to the user (e.g., via display 209).

Method 400 may begin by calculating the ski pole axial force at a time T1 within a calculation frame (block 402). This may include, for example, determining the axial force exerted on or through the ski pole via a sensor mounted to or otherwise associated with the ski pole (block 402). For example, the axial force at a time T1 may correspond to the axial force measured at a specific time within the calculation frame, as discussed above with reference to FIG. 3A (block 402).

Method 400 may include calculating the skier's velocity at the same time T1 within the calculation frame (block 404). This may include, for example, measuring a change in the skier's position as a function of time such that the skier's instantaneous velocity or horizontal velocity at time T1 can be calculated, as discussed above with reference to FIG. 3B (block 404). This may also include, for example, measuring the skier's acceleration over the calculation frame using one or more accelerometers, integrating the skier's acceleration to determine the skier's velocity as a function of time, and determining the skier's instantaneous velocity at the time T1 (block 404). This may also include, for example, measuring the skier's vertical velocity over the calculation frame using one or more barometers to evaluate the change in barometric pressure due to vertical movement of the skier and determining the skier's instantaneous vertical velocity at the time T1 (block 404). In embodiments, the method may include identifying a velocity using information received from a GPS receiver.

Method 400 may include calculating the ski pole angle relative to the skier's direction of travel at time T1 (block 406). To do so, method 400 may include optionally performing additional calculation steps 405 based upon the type of sensors that are implemented. In other words, depending on the particular type of sensor that is used, the ski pole angle data may indicate the actual angle of the ski pole or other metrics that are used to derive this information.

In some embodiments, the ski pole angle relative to the skier's direction of travel may be calculated directly from ski pole angle data received from one or more sensors (e.g., one or more of sensor units 201.3-201.4, 201.5-201.6, 201.9-201.10, etc.). For example, the sensor unit may be implemented as an electronic level or other suitable type of sensor configured to measure the ski pole angle relative to the horizontal. In such a case, method 400 may include calculating the ski pole angle relative to the direction of skier motion at any suitable time based upon the angle indicated by the ski pole angle data correlated to that particular time (block 406).

In other embodiments, method 400 may include indirectly calculating the ski pole angle relative to the skier's direction of travel from ski pole angle data received from one or more sensors. For example, one or more sensor units may be implemented as accelerometers or gyroscope-based sensors configured to track the acceleration or angular velocity of the ski pole over a complete revolution of ski pole movement. In such a case, method 400 may optionally include blocks 405.1-405.4 and block 406 to calculate the instantaneous ski pole angle relative to the skier's direction of travel at a particular time T1 within the calculation frame.

To do so, method 400 may include calculating the ski pole angular velocity as a function of time within the calculation frame. This may include, for example, utilizing ski pole angle data received from dual linear accelerometers or from an angular accelerometer within the calculation frame and integrating the angular acceleration of the ski pole to determine the angular velocity. This may also include, for example, utilizing ski pole angle data received from a gyroscope-based sensor to track the angular velocity of the ski pole over a complete revolution of ski pole movement. Method 400 may include determining the angular velocity of the ski pole as a function of time within a single calculation frame using this tracked angular velocity.

Once the angular velocity of the ski pole as a function of time within the calculation frame is known, method 400 may include calculating the ski pole instantaneous angular velocity at a time T2 within the calculation frame. This may include, for example, correlating the time T2 to the ski pole angular velocity determined as a function of time to determine the ski pole instantaneous angular velocity at a subsequent time T2 within the calculation frame. In other words, once the ski pole angular velocity as a function of time is calculated, the ski pole angular velocity at any time within the calculation frame may also be calculated by evaluating this function at a particular time instant.

Thus, using this information, method 400 may include calculating the ski pole angle at a time T2 relative to the ski pole angle at the start of the calculation frame (time T0) (block 405.1). In other words, with reference to FIG. 1A, method 400 may calculate the angle of the ski pole $\phi$ at a subsequent time T2 with reference to the angle of the ski pole at time T0 (the beginning of the calculation frame). Method 400 may then calculate the ski pole angle at a later time T2 within the calculation frame, for example, in accordance with Eqn. 7 (block 405.1). For example, using the ski pole angular velocity at all time frames between T0 and T2, a change in the ski pole angle $\phi$ over the time period T2-T0 may be calculated (block 405.1).

Method 400 may include calculating the ski pole angle relative to the horizontal at time T0 (block 405.2). For example, the calculated ski pole angle at all time frames between T0 and T2 (block 405.1), and the calculated ski pole angular velocity as a function of time, the angle of the ski pole relative to the horizontal at the time T0 may also be calculated (block 405.2). In other words, the angular rate at which the ski pole changes (the angular velocity as a function of time), the period of time over which the ski pole has moved (T2-T0), and the angle of the ski pole relative to the horizontal at time T0 may each be known. Using this information, method 400 may then calculate the angle of the ski pole relative to the horizontal at any time between T0-T2, such as the angle of the ski pole relative to the horizontal at time T0, for example (block 405.2). Method 400 may also include calculating the angle of the ski pole relative to the horizontal at the time T1 (block 405.3), which is the same time instant associated the calculated ski pole instantaneous axial force (block 402) and the skier's calculated instantaneous velocity (block 404).

Once the instantaneous ski pole angle relative to the horizontal at time T1 is known (block 405.3), this angle may then be translated into the skier's frame of reference to calculate the ski pole angle relative to the direction of the skier at time T1 (block 406). To do so, method 400 may include calculating the angle of the skier motion relative to horizontal at time T1 (block 405.1). For example, method 400 may include calculating the skier's velocity at time T1 (block 404) relative to the vertical and the horizontal, and using the vertical and horizontal velocities to calculate the ground inclination angle $\theta$ as a function of time in accordance with Eqn. 11 (block 405.4). The ground inclination angle $\theta$ may also be calculated as a function of time, for example, by analyzing changes in GPS coordinates over time and/or changes in barometric pressure, as discussed above (block 405.4). Once the ground inclination angle $\beta$ is calculated as a function of time, method 400 may calculate the angle of the skier's direction of travel relative to the horizontal at time T1 by evaluating this function at time T1 (block 405.4).

Once the angle of the skier's direction of travel relative to the horizontal at time T1 is known (block 405.4), method 400 may include subtracting this angle from the ski pole angle relative to the horizontal in accordance with Eqn. 12 to provide the ski pole angle relative to the skier's direction of travel (block 406).

And once the ski pole angle relative to the skier's direction of travel is known (block 406), method 400 may include calculating the power transferred though the ski pole at time T1 (block 408). This may include multiplying the vector component of the instantaneous ski pole axial force (block 402) in the direction of skier's travel calculated at time T1 (using the ski pole angle relative to the skier's direction of motion) with the skier's calculated instantaneous velocity at time T1 (block 404) to determine the power generated by the skier at the time T1 (block 408).

As discussed above, the skier's power generated over one or more complete ski pole revolutions may be calculated and optionally displayed to the skier via display 209 while the skier is skiing or after the skier has completed a skiing session. Embodiments include additional or alternate skiing metrics being calculated by metric calculation module 219 using sensor data received from various sensor sources, such as one or more of sensor units 201.1-201.N, sensor array 208, location-determining component 210, etc. These skiing metrics, like the power generated by the skier, may also be displayed while the skier is skiing in real-time or near real-time, or after the skier has completed a skiing session. Some of these skiing metrics may be particularly useful as feedback for the skier to view while skiing to adapt her form on the fly, for example, or to otherwise view relevant information.

Figure 5:
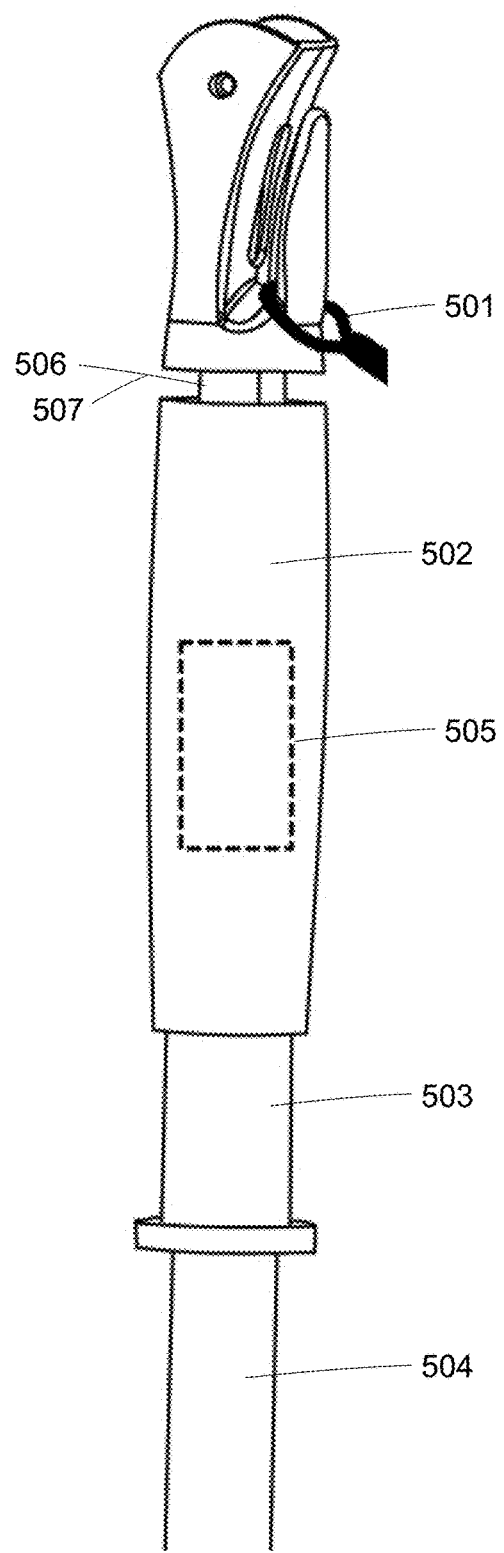
FIG. 5 is a graphical representation illustrating the grip area of the ski pole, according to an embodiment.

A sensor unit configured to generate force data indicative of a force exerted by a skier on a ski pole may be attached to, integrated within or coupled with the ski pole. FIG. 5 is a graphical representation illustrating the grip area of the ski pole, according to an embodiment. The ski grip assembly 500 includes a strap attachment mechanism 501, grip 502, grip attachment area 503, shaft 504, one or more interlock elements 505, one or more load sensor substrates 506 and one or more load measurement device 507. The sensor unit may include a combination of the one or more load sensor substrates 506, the one or more load measurement devices 507 and a processing unit coupled with the one or more load sensor substrates 506, the one or more load measurement devices 507. The processing unit may output data relating to the force exerted by a skier on a ski pole. In embodiments, the Strap attachment mechanism 501 provides the main interaction point between the skier's hand, via a strap or specialized glove, and grip 502 during the majority of the ski pole cycle. Grip 502 provides a location for hand to hold, partially hold or provides an interconnect to the remainder of the pole assembly, where the hand can be placed. The grip 502 is comprised of 1 or more parts. Grip attachment area 503 is positioned on shaft 504, providing a position for the grip 502 to be removably coupled to the shaft 504 for use. The grip attachment area 503 can be integrated directly or be created as an individual component affixed to the shaft 504. Part of the grip attachment area 503 may interact with the hand or strap parts to assist in holding and or force input by the hand. Shaft 504 consists of a long shaft used to transfer the force from the grip 502, through grip attachment area 503, into the ground. Shaft 504 can be comprised of 1 or more parts, which may include the lower components of the basket and tip.

The interface between the grip 502 and grip attachment area 503 allows for easy coupling (mating) and uncoupling (de-mating) of the components (including the sensor unit) using one or more interlock elements 505. The interlock elements 505 provide means of mechanical coupling, such as areas of increased friction, detent or bump features, screws, clips, press fits, pins, snaps and/or cams. Load sensor substrates 506 may be a section or sections of the grip 502, grip attachment area 503 and/or shaft 504 that concentrates the force being applied to the system, by the skier, through a single area. Load measurement device 507 may be positioned on, at or near the load sensor substrate 506 and configured to provide information relating to a force being applied to the system by the user. For instance, the load measurement device 507 may output a voltage indicative of strain (deformation) of the load sensor substrate 506 when force is applied to the substrate. In embodiments, the load measurement device 507 may be a strain gauge, and more specifically, a resistive strain gauge in a Wheatstone bridge configuration. Although FIG. 5 shows load sensor substrates 506 and load measurement device 507 configured at the distal end of the ski pole assembly, embodiments include configuring these elements mounted in many suitable configurations.

In some embodiments, load sensor substrates 506 and load measurement device 507 may be mounted within the body of the grip 502. In other embodiments, load sensor substrates 506 and load measurement devices 507 may be mounted at an interface between grip 502 and grip attachment area 503. In yet other configurations load sensor substrates 506 and load measurement device 507 may be mounted onto or integrated within shaft 504.

In embodiments, the orientation of load sensor substrates 506 may be aligned axially with the shaft 504 such that applied loads by the skier, through the strap attachment mechanism 501 and grip 502, act on the load sensor substrates 506 in compression of the same axis. In other embodiments, the orientation of load sensor substrates 506 are positioned to be in tension when the rest of the pole is under axial compression.

The sensor unit's load measurement device 507 may provide information using one or more strain gauge elements configured to measure the strain caused by the distortion of the load sensor substrate 506 during loading applied by the skier. The force may be applied to grip 502 or through the strap attachment mechanism 501 of the ski pole.

The sensor unit's load sensor substrates 506 and load measurement device 507 may be positioned in the interface between grip 502 and grip attachment area 503 such that the loads applied by the skier, to grip 502 or through the strap attachment mechanism 501 of the ski pole, are measured by the distortion caused within this interface. In other embodiments, the sensor unit's load sensor substrates 506 and load measurement device 507 are coupled directly to the grip attachment area 503, through any number of mechanical means, thus measuring the distortion caused within the load sensor substrates 506 themselves.

FIG. 6A is a graphical representation illustrating one possible sensor unit 600 and adjacent components, according to an embodiment. The load sensor substrate 601 interfaces with pole 602 and grip interface 603. Pole grip 604 is shown for clarity. The pole grip 604 provides an area for the user to hold the pole. The grip interface 603 functions to transfer the loads applied by a user directly to the load sensor substrate 601. The load sensor substrate 601 deforms slightly under load when force is applied by the skier, and that deformation is measured by the load measurement device of sensor unit 600. Additionally, the load sensor substrate 601 transfers the load entirely to the pole 602, which allows the user to apply force to the ground using the ski pole. In an embodiment, grip interface 603 and pole grip 604 can be combined into one component. Load sensor substrate 601 may also interface with a pole adapter that could allow for easy removal of pole by a user.

FIG. 6B is a graphical representation illustrating another possible sensor unit 650 and adjacent components, according to an embodiment. The load sensor substrate 651 of sensor unit 650 interfaces with the grip interface 652 by use of the grip pin 653. The sensor substrate 651 of sensor unit 650 is attached to the pole interface 654 by use of a pole pin 655. In this embodiment, the force (load) applied by the user is entirely transferred to the grip interface 652. The load is transferred to the load sensor substrate 651 by use of the grip pin 653. The load sensor substrate 651 transfers the force to the pole interface 654 by use of the pole pin 655. The load is transferred to the pole, allowing a user to apply force to the ground using the ski pole. In this embodiment, the sensor unit 650 transfers the input force from a user into a tension on the load sensor substrate 651. The load sensor substrate 651 may be shaped in such a way as to respond to tension by bending the member(s) between the locations for the pin connections. The bending of these member(s) is measured by a load measurement device of sensor unit 650. In other embodiments, sensor substrate 651 is configured to measure axial deformation under tension.

Figure 7:
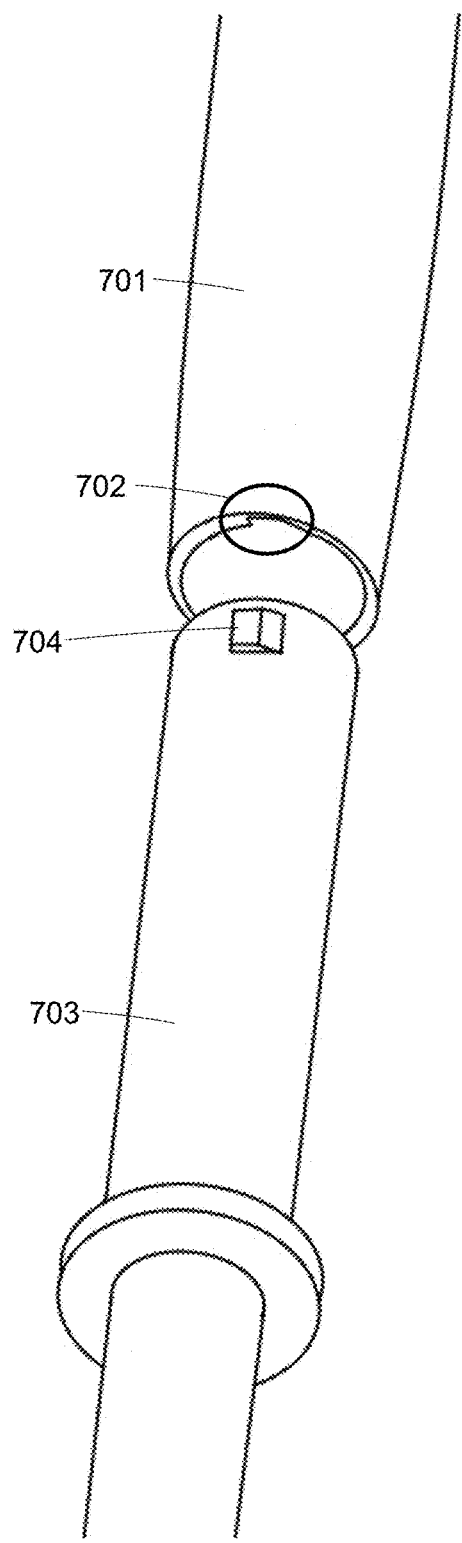
FIG. 7 is a graphical representation illustrating the grip attachment area of the ski pole, according to an embodiment.

FIG. 7 is a graphical representation illustrating the grip attachment area of a ski pole, according to an embodiment. The ski grip 701 includes a thread slot feature 702. The grip attachment area 703 includes a thread engagement feature 704, such that thread slot feature 702 and thread engagement feature 704 couple together to provide alignment, attachment and/or interlocking between grip 701 and grip attachment area 703 for mounting of a sensor unit to the ski pole.

Figure 8:
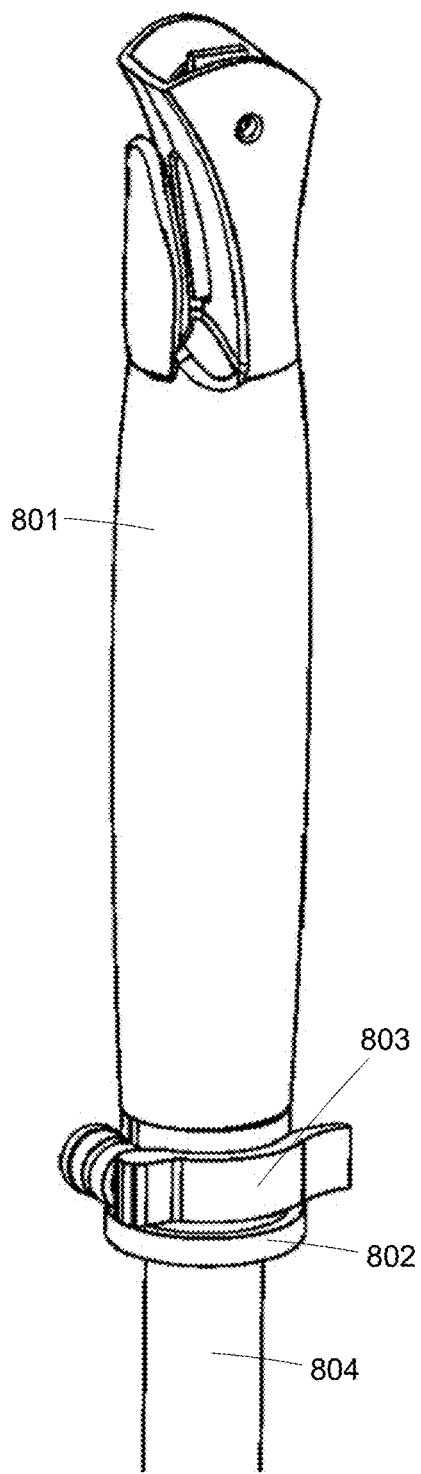
FIG. 8 is a graphical representation illustrating the grip attachment area of the ski pole, according to an embodiment.

FIG. 8 is a graphical representation illustrating the grip attachment area of a ski pole, according to an embodiment. The grip 801 is removably coupled to the grip attachment area 802, positioned on shaft 804, through a mechanical interlocking element 803 that mounts a sensor unit to the ski pole. In embodiments, grip 801 is aligned to the grip attachment area 802, through the use of alignment features, not shown in FIG. 8 for brevity. Once grip 801 is positioned relative to grip attachment area 802, mechanical interlocking element 803 is activated to interlock the two components together. In embodiments, mechanical interlocking element 803 may be a combination of a cam and a lever, where the interlocking element 803 exerts a compressive force to the grip attachment area 802 when engaged.

In embodiments, examples of additional types of metrics that may be calculated by the processing unit and displayed via ski power measurement system 200 are provided below with respect to UBP measurements. Some of these metrics may be used to calculate other metrics and not be displayed. As discussed above, embodiments include the metrics being calculated via one or more sensor units 201.1-201.N or portable computing device 202.

Power-based metrics: As discussed above, the power generated by the skier over a complete revolution of ski pole movement may be calculated. This data may be collected over several complete revolutions of ski pole movement from one or both ski poles to provide the skier with other power-related metrics. For example, if the power exerted by the skier is calculated for each ski pole, a proportion of power delivered on or through each ski pole may be calculated and optionally displayed, providing the skier with feedback regarding whether one side is favored and by how much.

Time: Time may be obtained from any suitable source as discussed herein (e.g., one implemented via portable computing device 202) and displayed. Additionally or alternatively, portable computing device 202 may calculate the times associated with the poling phase identified above (e.g., by determining a pole strike for one or both ski poles). This time may be further segmented to cover any portion of the poling phase such as displaying timing associated with complete revolutions of ski pole movement, the time when the ski pole is not in contact with the ground, etc.

Cadence: Cadence may be calculated using the ski pole angle data, force data and/or acceleration data described herein in conjunction with the identification of the poling phase timing. In this way, the skier's rhythm or ski pole pattern over several complete revolutions of ski pole movement may be displayed (e.g., by averaging the timing over one or more poling phases).

Pole Cycle: By identifying the ski pole angle throughout complete revolutions of ski pole movement, the pole cycle geometry may be determined and graphically displayed. For example, a graph may be displayed showing each instant in time when peak power was generated by the skier for one or both ski poles. These pole cycle timings may be heat mapped onto an "ideal" pole cycle that provides the best efficiency for the skier.

Force: Using the force-based sensors associated with one or both ski poles, the force exerted by the skier on or through the ski pole or ski pole strap may be collected over time and represented by force data, as discussed above. These force metrics derived from the force data may be collected over time and used to calculate and optionally display other force-based metrics such as the maximum force generated by the skier or the average force generated by the skier over several complete revolutions of ski pole movement. These force based metrics may be heat mapped onto a force-at-angle or force-at-time visual image for display during use or after completion of the activity.

Pole Force Transfer Ratio: Again, the axial component of force on or through the ski pole and the vector component of this force in the direction of the skier's travel may be calculated. Embodiments include using these metrics to calculate the skier's force used for forward propulsion as a percentage of the total force exerted by the ski pole.

Pole-to-Pole timing: Embodiments include collecting the timing for each ski pole to determine the ski pole timing cycle (e.g., using 2 separate data streams). Pole-to-pole timing may be calculated and optionally displayed, for example, as the timing of each ski pole relative to one another other or relative to a global (e.g., system) time.

Torso dynamics: Sensor data collected from a chest-worn sensor unit (e.g., sensor unit 201.N) may be used to calculate the position, angle, velocity, and/or acceleration of the skier's torso while skiing. This data may be optionally displayed to the skier while skiing to provide feedback regarding the skier's form.

Force Components x/y/z: As discussed herein, the force exerted by the skier on or through the ski pole may be determined using various types of force-based sensors. These force-based sensors may measure the force exerted on or through the ski pole by measuring the force exerted in one or more axes. In this way, the force measured in a particular direction (e.g., axially through the ski pole) may be measured by summing the vector components of force from one or more of these measured axes. In an embodiment, the measured force from each axis may be calculated. For example, the force exerted on or through individual strain bridges may be calculated to provide an isolated look of individual components of the force vector or used to calculate the overall force, or may be utilized for the force and ski power calculations as discussed above.

Pole technique: Pole angle data for a cycle is compared to a number of stored cycles corresponding to common poling techniques. This allows for identification of the particular poling technique for each cycle. Each moment of a skiing activity can thus be tagged with the identified poling technique for post-activity analysis.

Energy: Skier's kinetic energy can be calculated for all moments of an activity using skier's speed and mass as $E_k=\frac{1}{2}mv^2$. Skier's potential energy can be calculated for all moments of an activity using skier's elevation and mass as $E_p=mgh$. Power balance may then be calculated as $P_{in}=P_f+P_k+P_p$, where $P_{in}$ is the total input power (upper and lower body, or approximated by only upper body poling power), $P_f$ is the component of input power consumed by friction (snow, air), $P_k$ is the component of input power consumed by changes to kinetic energy (calculated as $P_k=dE_k/dt$) and $P_p$ is the component of input power consumed by changes to potential energy (calculated as $P_p=dE_p/dt$). Thus, if $P_{in}$, $P_k$, and $P_p$ are known, frictional power losses $P_f$ may be calculated, which may, for example, help identify optimum equipment-conditioning techniques.

Impulse: The collected pole force-based sensor data, being correlated to time, may be used to calculate impulse over various time intervals, such as over a poling cycle as, $J=\int F\,dt$, where $J$ is the impulse, and $F$ is the total force, or a force component, such as the component parallel to skier's direction of motion.

Power-based metrics: As discussed above, the power generated by the skier throughout a complete revolution of ski pole movement may be calculated from measured force exerted on or through the ski poles. Embodiments also include calculating the force exerted through one or more portions of the ski, boot, binding, etc., and determining the vector component of this force in the skier's direction of travel to determine the lower body power generated by the skier during each complete revolution of ski movement. Similar to the UBP metrics discussed above, this data may be collected over several complete revolutions of ski movement from one or both skis to provide the skier with other power-related metrics. For example, if the power exerted by the skier is calculated for each ski, a proportion of power delivered through each ski may be calculated and optionally displayed, providing the skier with feedback regarding whether one side is favored and by how much.

Time: Similar to the detection used for ski pole strikes, similar techniques may be utilized to determine ski "strikes" (e.g., using a threshold force to indicate the ski strike or the initiation of forward movement). Similar to the UBP time-based metrics, time for LBP time-based metrics may be obtained from any suitable source as discussed herein (e.g., one implemented via portable computing device 202) and displayed. Additionally or alternatively, portable computing device 202 may calculate the times associated with the skiing phase identified above (e.g., by determining a ski strike for one or both skis). This time may be further segmented to cover any portion of the skiing phase such as displaying timing associated with complete revolutions of ski movement, the time when the ski is not in contact with the ground, etc.

Cadence: Similar to the tracking of ski pole angle over time, the angle and/or acceleration of one or more skis may also be tracked. By analyzing collected data indicating the angle and/or acceleration of one or both skis over time, similar techniques may be utilized to calculate and optionally display the skier's rhythm or ski pattern over several complete revolutions of ski movement (e.g., by averaging the timing over several ski phases).

Ski Cycle: By identifying the ski angle throughout complete revolutions of ski movement, the ski geometry may be determined and graphically displayed. For example, a graph may be displayed showing each instant in time when peak power was generated by the skier for one or both skis. These ski cycle timings may be heat mapped onto an "ideal" ski cycle that provides the best efficiency for the skier.

Force: Using the force-based sensors associated with one or both skis, the force exerted by the skier on or through the ski may be collected over time, similar to the force data as discussed above with respect to the ski poles. These force metrics may be collected over time and used to calculate and optionally display other force-based metrics such as the maximum force generated by the skier or the average force generated by the skier over several complete revolutions of ski movement.

Ski Transfer Ratio: Similar to the force calculations for the ski poles, the force exerted by the skier into various portions of the skis may be calculated along with the vector component of this force in the direction of the skier's travel. Embodiments include using these metrics to calculate the skier's force used for forward propulsion as a percentage of the total force exerted by the ski.

Ski/Pole timing: Embodiments include collecting the timing for each ski and ski pole to determine the ski and ski pole timing cycle (e.g., using 4 separate data streams). Ski/pole timing may be calculated and optionally displayed, for example, as the timing of each ski and ski pole and/or ski relative to one another other or relative to a global (e.g., system) time.

Ski-to-Ski timing: Embodiments include collecting the timing for each ski to determine the ski timing cycle (e.g., using 2 separate data streams). Ski-to-ski timing may be calculated and optionally displayed, for example, as the timing of each ski relative to one another other or relative to a global (e.g., system) time.

Ski Cant: Embodiments include using the tracked movement of the skis to calculate and optionally display the relative positioning, trajectories, and/or velocities between each ski.

Force Components x/y/z: As discussed herein, the force exerted by the skier on or through the ski pole may be determined using various types of force-based sensors. These force-based sensors may also measure the force exerted through various components of the ski in one or more axes. Similar to the forces measured in the ski pole, the force measured in a particular direction with respect to the ski (e.g., the vector component of force exerted by the skier's boot into the ski in the same direction of travel as the skier) may be measured by summing the vector components of force from one or more of these measured axes. In an embodiment, the measured force from each axis may be calculated. For example, the force exerted on or through individual strain bridges may be calculated to provide an isolated look of individual components of the force vector or used to calculate the overall force, which is used for ski power calculations as discussed above.

Ski technique—Embodiments include using the measured movements of the poles and/or skis or recognize and/or categorize the specific motions used against a selection of known or exemplary ski techniques. These identified techniques can then be communicated to the skier post activity. Further embodiments identify deviations between the measured movements of the poles and/or skis to the exemplary techniques. These deviations can be used to suggest improvements to said technique to maximize performance.

Impulse—The collected ski force-based sensor data, being correlated to time, may be used to calculate impulse over various time intervals, such as over a poling cycle as, $J=\int F\,dt$, where J is the impulse, and F is the total force, or a force component, such as the component parallel to skier's direction of motion.

Some of the Figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

Having thus described various embodiments of the technology, what is claimed as new and desired to be protected by Letters Patent includes the following:

What is claimed is:

1. A system to calculate power generated by a skier, comprising:
   a first sensor unit configured to generate force data indicative of a force exerted by a skier on a ski pole;
   a second sensor unit configured to generate movement data indicative of movement of the skier in a direction of travel;
   a portable computing device in communication with the first sensor unit and the second sensor unit, the portable computing device configured to:
     receive the force data and the movement data,
     determine a speed based on the movement of the skier in the direction of travel,
     track the movement of the ski pole during a complete revolution of ski pole movement, and
     calculate the power generated by the skier based upon the force data measured over the complete revolution of ski pole movement and the determined speed of the skier in the direction of travel during the complete revolution of ski pole movement.

2. The system of claim 1, further comprising a display, wherein the portable computing device is further configured to display the calculated power generated by the skier during the complete revolution of ski pole movement on the display.

3. The system of claim 2, wherein portable computing device is further configured to:
   track the force data and the movement data for a plurality of complete revolutions of ski pole movement,
   calculate an average power generated by the skier based upon the force data measured over the plurality of complete revolutions of ski pole movement and the determined speed of the skier in the direction of travel over the plurality of complete revolutions of ski pole movement, and
   display the average power generated by the skier.

4. The system of claim 1, wherein the first sensor unit includes a strain gauge configured to generate force data indicative of a force exerted by the skier in an axial direction with respect to the ski pole.

5. The system of claim 1, further comprising a third sensor unit configured to generate ski pole angle data indicative of movement of the ski pole during the complete revolution of ski pole movement.

6. The system of claim 5, wherein the portable computing device is further configured to calculate a vector component of force exerted by the skier in the direction of travel during the complete revolution of ski pole movement by correlating the force exerted by the skier at each of a plurality of instances of time during the complete revolution of ski pole movement to the angle of the ski pole at each of the plurality of instances in time.

7. The system of claim 1, wherein the second sensor unit includes a global navigation satellite system (GNSS) receiver configured to generate the movement data indicative of changes in the skier's geographic position in the direction of travel.

8. A system to calculate power generated by a skier during a skiing session, comprising:
a display;
a sensor module mountable to a ski pole, the sensor module including:
a first sensor unit configured to generate force data indicative of a force exerted by a skier, and
a second sensor unit configured to generate ski pole angle data indicative of movement of the ski pole;
a third sensor unit configured to generate movement data indicative of the movement of the skier in a direction of travel; and
a portable computing device in communication with the display, the sensor module, and the third sensor unit the portable computing device configured to:
receive the force data, the ski pole angle data, and the movement data,
identify time periods associated with a complete revolution of ski pole movement based on the force data or the ski pole angle data,
determine a speed based on the movement of the skier in the direction of travel,
calculate power generated by the skier during each identified time period based upon the force data and the movement data corresponding to the identified time periods; and
display calculated power generated by the skier on the display.

9. The system of claim 8, wherein the portable computing device identifies a complete revolution of ski pole movement when the force data or the ski pole angle data indicate return of the ski pole to a previous position.

10. The system of claim 8, wherein the wherein the third sensor unit includes a global navigation satellite system (GNSS) receiver configured to generate the movement data indicative of changes in the skier's geographic position in the direction of travel.

11. The system of claim 8, wherein the third sensor unit includes an accelerometer configured to generate the movement data indicative of changes in the skier's geographic position in the direction of travel.

12. The system of claim 8, wherein the ski pole angle data represents an angular velocity or acceleration of the ski pole.

13. The system of claim 12, wherein the portable computing device is further configured to calculate a vector component of force exerted by the skier in the direction of travel during a complete revolution of ski pole movement by correlating a timing of the force data to a timing of the ski pole angle data.

14. The system of claim 8, further comprising an interlocking element mounts the sensor module to the ski pole, wherein the first sensor unit includes a load sensor substrate and a load measurement device, the load measurement device configured to generate force data indicative of a force exerted by the skier on the ski pole.

15. A system to calculate power generated by a skier through a ski pole during a skiing session, comprising:
a first sensor unit configured to generate force data indicative of a force exerted by the skier on the ski pole;
a second sensor unit configured to generate ski pole angle data indicative of movement of the ski pole;
a third sensor unit configured to generate movement data indicative of the movement of the skier in a direction of travel; and
a portable computing device in communication with the first sensor unit, the second sensor unit, and the third sensor unit, the portable computing device configured to:
receive the force data, the ski pole angle data, and the movement data,
track force exerted by the skier and movement of the ski pole over a complete revolution of ski pole movement;
determine a speed based on the movement of the skier in the direction of travel,
identify, for each of a plurality of time instants throughout the complete revolution of ski pole movement, a vector component of force exerted by the skier in the direction of travel by correlating the force exerted by the skier to the angle of the ski pole at each time instant; and
calculate power generated by the skier based on the vector component of force exerted by the skier and the speed of the skier movement in the direction of travel for each of the plurality of time instants.

16. The system of claim 15, further comprising a display, wherein the portable computing device is further configured to display the calculated power on the display.

17. The system of claim 16, wherein the portable computing device is further configured to:
track force exerted by the skier and the movement of the ski pole over a plurality of complete revolutions of ski pole movement,
calculate an average power generated by the skier based upon the force data measured over the plurality of complete revolutions of ski pole movement and the distance the skier moved in the direction of travel over the plurality of complete revolutions of ski pole movement, and display the average power generated by the skier.

18. The system of claim 15, wherein the first sensor unit includes a strain gauge configured to generate force data indicative of a force exerted by the skier in an axial direction with respect to the ski pole.

19. The system of claim 15, wherein the portable computing device identifies a complete revolution of ski pole movement when the force data or the ski pole angle data indicate return of the ski pole to a previous position.

20. The system of claim 15, wherein the portable computing device includes a global navigation satellite system (GNSS) receiver configured to generate the movement data indicative of changes in the skier's geographic position in the direction of travel.

\* \* \* \* \*